US00RE50426E

(19) United States
(12) Reissued Patent
Yoon et al.

(10) Patent Number: US RE50,426 E
(45) Date of Reissued Patent: May 13, 2025

(54) ICE MAKER

(71) Applicant: SAMSUNG ELECTRONICS CO., LTD., Suwon-si (KR)

(72) Inventors: Jinkook Yoon, Suwon-si (KR); Jinseung Choi, Suwon-si (KR); Myungseob Song, Suwon-si (KR); Minsoo Kim, Suwon-si (KR)

(73) Assignee: Samsung Electronics Co., Ltd., Suwon-si (KR)

(21) Appl. No.: 17/841,248

(22) Filed: Jun. 15, 2022

Related U.S. Patent Documents

Reissue of:
(64) Patent No.: 10,969,152
Issued: Apr. 6, 2021
Appl. No.: 16/245,891
Filed: Jan. 11, 2019

(30) Foreign Application Priority Data

Jan. 16, 2018 (KR) ..... 10-2018-0005779

(51) Int. Cl.
*F25C 1/24* (2018.01)
*F25C 1/04* (2018.01)
(Continued)

(52) U.S. Cl.
CPC ..... *F25C 1/24* (2013.01); *F25C 1/04* (2013.01); *F25C 1/18* (2013.01); *F25C 5/08* (2013.01);
(Continued)

(58) Field of Classification Search
CPC ..... F25C 1/24; F25C 1/18; F25C 1/04; F25C 5/22; F25C 5/08; F25C 2700/14;
(Continued)

(56) References Cited

U.S. PATENT DOCUMENTS 3,952,539 A * 4/1976 Hanson ..... F25C 1/18 62/351
5,056,321 A * 10/1991 Patrick ..... F25C 1/04 62/351
(Continued)

FOREIGN PATENT DOCUMENTS

CN 1031414 A 3/1989
CN 1605823 A 4/2005
(Continued)

OTHER PUBLICATIONS

Korean Office Action for KR Application No. 10-2018-0005779 issued Jan. 21, 2021.
(Continued)

*Primary Examiner* — William C Doerrler
(74) *Attorney, Agent, or Firm* — Nixon & Vanderhye P.C.

(57) ABSTRACT

Disclosed are an ice maker, which can make ice with high transparency. The ice maker includes an ice making container configured to be filled with ice-making water; a heating ice-separator comprising a heating rod extended from above a water surface of the ice-making water into the ice making container so as to be immersed in the ice-making water and configured to transfer heat to the ice-making water, and a rotary shaft connecting with the heating rod, extended to traverse an upper portion of the ice making container, and configured to rotate the heating rod to be separated from the ice making container; and a heater configured to supply heat to the heating rod. By using the heater, the ice maker can not only make the ice with the high transparency, but also make ice-separation structure be simplified.

56 Claims, 38 Drawing Sheets

(51) Int. Cl.

| | |
|---|---|
| ***F25C 1/18*** | (2006.01) |
| ***F25C 5/08*** | (2006.01) |
| ***F25C 5/20*** | (2018.01) |
| ***F25D 11/02*** | (2006.01) |
| ***F25D 17/06*** | (2006.01) |

(52) U.S. Cl.
CPC ..... *F25C 5/22* (2018.01); *F25C 2305/024* (2021.08); *F25C 2400/04* (2013.01); *F25C 2400/06* (2013.01); *F25C 2400/08* (2013.01); *F25C 2400/10* (2013.01); *F25C 2600/02* (2013.01); *F25C 2600/04* (2013.01); *F25C 2700/14* (2013.01); *F25D 11/022* (2013.01); *F25D 17/065* (2013.01)

(58) Field of Classification Search
CPC ..... F25C 2400/10; F25C 2600/02; F25C 2305/024; F25C 2600/04; F25C 2400/06; F25C 2400/08; F25C 2400/04; F25D 11/022; F25D 17/065
See application file for complete search history.

(56) References Cited

U.S. PATENT DOCUMENTS

| | | | | |
|---|---|---|---|---|
| 5,187,948 | A * | 2/1993 | Frohbieter | F25C 1/18 62/353 |
| 6,357,720 | B1 * | 3/2002 | Shapiro | F25C 1/18 426/66 |
| 6,935,124 | B2 | 8/2005 | Takahashi et al. | |
| 7,134,292 | B2 | 11/2006 | Oh | |
| 8,371,133 | B2 | 2/2013 | Kim et al. | |
| 8,516,846 | B2 | 8/2013 | Lee et al. | |
| 9,574,811 | B2 | 2/2017 | Papalia | |
| 9,599,389 | B2 | 3/2017 | Bortoletto et al. | |
| 9,689,600 | B2 | 6/2017 | Jeong et al. | |
| 11,035,601 | B2 | 6/2021 | Jeong et al. | |
| 11,105,547 | B2 | 8/2021 | Song et al. | |
| 2002/0083726 | A1 | 7/2002 | Kim et al. | |
| 2004/0025527 | A1 | 2/2004 | Takahashi et al. | |
| 2004/0050079 | A1 * | 3/2004 | Holmes | F25D 29/00 62/187 |
| 2005/0072167 | A1 * | 4/2005 | Oh | F25C 5/187 62/137 |
| 2006/0168983 | A1 | 8/2006 | Tatsui et al. | |
| 2007/0098904 | A1 * | 5/2007 | Aschner | F27B 17/0025 427/372.2 |
| 2007/0186570 | A1 | 8/2007 | Kopf | |
| 2008/0173040 | A1 * | 7/2008 | Lim | F25C 5/22 62/354 |
| 2009/0049858 | A1 * | 2/2009 | Lee | F25C 5/08 62/349 |
| 2009/0165467 | A1 * | 7/2009 | Kim | F25C 1/00 62/3.63 |
| 2009/0199569 | A1 * | 8/2009 | Petrenko | B64D 15/12 62/3.1 |
| 2009/0211266 | A1 | 8/2009 | Kim et al. | |
| 2009/0223230 | A1 * | 9/2009 | Kim | F25C 1/08 62/73 |
| 2009/0308085 | A1 * | 12/2009 | DeVos | F25C 5/08 62/73 |
| 2009/0308095 | A1 | 12/2009 | An et al. | |
| 2010/0018226 | A1 * | 1/2010 | Kim | F25C 1/18 62/73 |
| 2010/0031675 | A1 | 2/2010 | Kim et al. | |
| 2010/0299846 | A1 | 12/2010 | Holzhauer et al. | |
| 2011/0094254 | A1 * | 4/2011 | Kim | F25C 1/04 62/344 |
| 2014/0083127 | A1 | 3/2014 | Jeong et al. | |
| 2014/0182315 | A1 | 7/2014 | Kim et al. | |
| 2015/0107275 | A1 * | 4/2015 | Papalia | F25C 1/04 62/340 |
| 2015/0107276 | A1 | 4/2015 | Bortoletto et al. | |
| 2016/0252286 | A1 | 9/2016 | Jeong et al. | |
| 2016/0302350 | A1 * | 10/2016 | Kinzenbaw | A01B 73/005 |
| 2017/0023283 | A1 | 1/2017 | Boarman et al. | |
| 2017/0074571 | A1 | 3/2017 | Boarman et al. | |
| 2017/0089629 | A1 | 3/2017 | Ji et al. | |
| 2017/0122637 | A1 * | 5/2017 | Mor | F25C 1/04 |
| 2017/0307271 | A1 * | 10/2017 | Myers | F25C 1/243 |
| 2017/0321943 | A1 * | 11/2017 | Ji | D25C 1/04 |
| 2018/0187941 | A1 * | 7/2018 | An | F25C 5/08 |
| 2018/0231294 | A1 | 8/2018 | Song et al. | |
| 2020/0064043 | A1 * | 2/2020 | Larson | F25C 5/08 |
| 2020/0072522 | A1 * | 3/2020 | Murphy | F25C 1/22 |

FOREIGN PATENT DOCUMENTS

| | | | |
|---|---|---|---|
| CN | 101520261 | A | 2/2009 |
| CN | 206583158 | U | 10/2017 |
| DE | G 90 04 370.7 | | 6/1990 |
| DE | 9 004 370 | U | 8/1990 |
| DE | 40 23 664 | C1 | 8/1991 |
| EP | 3 361 194 | A1 | 8/2018 |
| EP | 3 361194 | | 8/2018 |
| GB | 2 208 917 | A | 4/1989 |
| JP | H01-181060 | A | 7/1989 |
| JP | H02-254276 | A | 10/1990 |
| JP | H053867 | U | 1/1993 |
| JP | H05-164440 | A | 6/1993 |
| JP | 2001-041623 | | 2/2001 |
| JP | 2004-0347310 | A | 12/2004 |
| JP | 2005-331200 | A | 2/2005 |
| JP | 4680311 | B | 3/2011 |
| JP | 2011-112279 | | 6/2011 |
| JP | 2011-185541 | A | 9/2011 |
| KR | 10-2007-0077672 | A | 1/1993 |
| KR | 10-2006-0059632 | A | 6/2006 |
| KR | 10-2006-0060450 | | 6/2006 |
| KR | 10-2006-0106052 | A | 10/2006 |
| KR | 10-2007-0119271 | | 12/2007 |
| KR | 10-0833860 | | 6/2008 |
| KR | 10-2008-0061469 | | 7/2008 |
| KR | 10-2009-0092385 | A | 9/2009 |
| KR | 10-1500731 | B | 9/2009 |
| KR | 10-2009-0129922 | | 12/2009 |
| KR | 10-1519877 | B | 12/2009 |
| KR | 10-2010-0124068 | A | 11/2010 |
| KR | 10-2011-0003655 | A | 1/2011 |
| KR | 10-2009-0019322 | A | 3/2011 |
| KR | 10-2011-0080101 | | 7/2011 |
| KR | 10-1613415 | B | 7/2011 |
| KR | 10-2013-0020063 | A | 2/2013 |
| KR | 10-1500731 | B1 | 3/2015 |
| KR | 10-2016-0105218 | A | 9/2016 |

OTHER PUBLICATIONS

International Search Report for International Application No. PCT/KR2019/006540 issued May 8, 2019.
Extended European Search Report for EP Application No. 19151463.7 issued Jun. 13, 2019.
Notification of the First Office Action in CN Application No. 201980006577.4 issued Aug. 23, 2021.
Written Opinion for International Application No. PCT/KR2019/000540 issued May 8, 2019.
Korean Notice of Allowance dated Dec. 22, 2022 for KR Application No. 10-2022-0098727.
European Office Action dated Feb. 17, 2023 for EP Application No. 22206461.0.
Chinese Office Action for Chinese Application No. 201980006577.4 issued Aug. 23, 2021.
Supplemental European Search report for Application No. EP 19 74 1477 issued Jan. 12, 2021.
Korean Office Action for Application No. KR 10-2018-005870 issued Jan. 21, 2022.
Korean Office Action for Application No. 10-2022-0008789 issued Feb. 28, 2022.

(56) References Cited

OTHER PUBLICATIONS

Non-Final Office Action in U.S. Appl. No. 16/962,350 mailed Nov. 12, 2020.
WO/ISR for PCT/KR2019/000568 dated Apr. 30, 2019.
Reissue U.S. Appl. No. 17/841,949, filed Jun. 16, 2022 (Reissue of U.S. Pat. No. 11,105,547).
European Search Report dated Jun. 30, 2023 for EP Application No. 22206461.0.
European Intention to Grant dated Nov. 27, 2023 for EP Application No. 19151463.7.
Chinese Office Action dated Jan. 22, 2024 for CN Application No. 202210466310.7.
Chinese Search Report dated Oct. 2021 for CN Application No. 202210466310.7.

* cited by examiner

FIG. 38

| | | Heating TIME (MINUTES) | | | |
|---|---|---|---|---|---|
| | | 1 | 2~2.5 | 2~3 | 3~4 |
| Heating PERIOD (MINUTES) | 1~3 | | 67min/80% | 70min/60% | 80min/60% |
| | 3 | | 78min/90% | 70min/60% | 60min/50% |
| | 2~3 | | 78min/90% | 70min/50% | 55min/50% |
| | 3~4 | | 60min/90% | 70min/50% | 55min/50% |
| | 4~5 | | 60min/90% | 70min/40% | 55min/50% |
| | 5 | | 60min/90% | 70min/40% | 80min/90% (40%ICE MAKING) |
| | 5~6 | | 80min/60% | 70min/40% | |
| | 6~7 | | 80min/60% | 80min/40% | |
| | 10-7-5-4 | 80min/40% | | | |

ICE MAKER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED THE APPLICATION

This application is based on and claims priority under 35 U.S.C. § 119 to Korean Patent Application No. 10-2018-0005779, filed on Jan. 16, 2018 in the Korean Intellectual Property Office, the disclosure of which is incorporated by reference herein in its entirety.

BACKGROUND

Field

The disclosure relates to an ice maker which can make ice with high transparency.

Description of the Related Art

A refrigerator refers to an apparatus that employs a refrigeration cycle to store things at a low temperature by supplying a chill to a storage compartment, and make ice by supplying a chill to an ice-making compartment.

The ice-making compartment is kept at a freezing point of water, i.e. 0° C. or below while an ice making container is filled with ice-making water. The ice-making water in the ice making container starts to freeze from a part that first comes into contact with an ambient chill, and gradually freezes toward the center. That is, the ice-making water in the ice making container starts to freeze from a water surface that first comes into contact with the ambient chill or from a part being in contact with the inner surface of the ice making container and thus forms an ice nucleus from which formation of an ice crystal is triggered and propagates toward the center of the ice making container filled with the ice-making water, thereby entirely becoming ice. The ice-making water supplied to the ice making container contains a certain amount of air in the form of bubbles. To make clear ice, such air bubbles have to be rapidly exhausted into the air. However, in practice, the air bubbles are not exhausted into the air but remain in the water during ice making, and therefore cloudy ice is ultimately made.

To make ice transparent by eliminating the air bubbles, there has been proposed a technique that a thawing rod for radiating heat is immersed in the ice-making water filled in the ice making container. After ice is completely made, such a conventional technique takes the thawing rod out of the ice-making water unfrozen in the vicinity thereof and then rotates an ejector to separate ice. To this end, a heating device used when the thawing rod is immersed in and taken out of the ice-making water, a space occupied by the heating device, a separating device and a space occupied by the separating device have to be all taken into account when designed, and therefore a problem arises in that an ice making unit has a complicated structure and becomes bulky.

Further, in the conventional technique, the formation of the ice crystal is achieved simultaneously throughout the inner surface of the ice making container, i.e. on both the lateral surface and the bottom surface, and therefore the ice formation propagating in a direction from the lateral surface toward the center may meet the ice formation propagating in a direction from the bottom surface toward the center. Such an overlap of the ice formation may cause the ice to contain air bubbles or accelerate a freezing speed to thereby lead to opaque ice.

SUMMARY

An aspect of the disclosure is to provide an ice maker in which a freezing condition is uniform to improve transparency of ice and ice is made and separated by a simple structure.

According to an embodiment of the disclosure, there is provided an ice maker including: an ice making container configured to be filled with ice-making water; a heating ice-separator comprising a heating rod extended from above a water surface of the ice-making water into the ice making container so as to be immersed in the ice-making water and configured to transfer heat to the ice-making water, and a rotary shaft connecting with the heating rod, extended to traverse an upper portion of the ice making container, and configured to rotate the heating rod to be separated from the ice making container; and a heater configured to supply heat to the heating rod. Thus, when the heating ice-separator transfers heat to the ice-making water while making ice, and rotates while separating ice to thereby easily separate the made ice.

The ice making container may have a hemispheric inner surface, thereby maintaining the freezing direction in a single direction.

An end of the heating rod may be extended up to a bottom of the ice making container in the range of not affecting rotation, thereby making the freezing direction face from the lateral side of the inner surface of the ice making container toward the heating ice-separator.

The heating rod may be extended toward a bottom of the ice making container.

The rotary shaft may include a hollow in a lengthwise direction, and the heater may be inserted in the hollow of the rotary shaft and configured to heat the heating rod, thereby effectively heating the heating rod.

The rotary shaft may rotate around the heater.

The heater may be provided leaving a first air gap from an inner surface of the rotary shaft, thereby not only making the rotary shaft effectively rotate with regard to the heater but also preventing the heater from abrasion.

The ice maker further includes a rotation driver configured to rotate the rotary shaft, the rotary shaft including: a first rotary shaft supporting the heater and including the heating rod; and a second rotary shaft configured to surround the first rotary shaft and transfer power of the rotation driver to the first rotary shaft, thereby not only effectively transferring power but also making it easy to manufacture the ice maker.

The first rotary shaft may include a material having high thermal conductivity, and the second rotary shaft may include a material having lower thermal conductivity than the first rotary shaft.

The second rotary shaft may be provided leaving a second air gap from the first rotary shaft, thereby decreasing transfer of heat from the heater to the second rotary shaft.

The heating rod may include a heating head including an outer circumferential surface having a curvature corresponding to the inner surface of the ice making container.

The heating rod may include a plurality of pores, thereby eliminating air bubbles that lowers transparency of ice.

The heating rod may be subjected to hydrophilic surface treatment.

The heating rod may be internally provided with a hollow, and the heater may be inserted in the hollow.

The heater may include an electric cable configured to supply power, and the electric cable may be arranged to be wound and unwound as the heater rotates, thereby preventing durability from being lowered by a twist of the electric cable when separating ice.

The heater may be rotated when ice is made or separated, and a power connector may be provided to supply power corresponding to the rotation.

The ice maker may further include an ice-separation guide extended from an edge of the ice making container toward the rotary shaft, and configured to guide ice to be separated from the heating rod, thereby making the heating rod be easily withdrawn from separating ice.

The ice-separation guide may have an arc shape of which a radius of curvature gradually decreases from the edge of the ice making container toward the rotary shaft.

The ice maker may further include a container supporter arranged above the ice making container, configured to support the ice making container, and including a cup to supply the ice-making water to the ice making container, thereby making the ice making container have uniform ice making conditions.

The ice making container may include at least one ice-making cell to be filled with the ice-making water and a cup adjacent to and integrated with the ice-making cell and configured to supply the ice-making water, and at least one perforation may be provided in a connecting portion between the ice-making cell and the cup, thereby decreasing transfer of a chill from the cup adjacent to the ice making container.

The ice making container may include a cooling fin to promote cooling of the ice-making water, thereby supplementing a part of the container, which lacks a chill, with a chill and controlling the ice making condition to be uniform.

According to another embodiment of the disclosure, there is provided an ice maker including: an ice making container comprising a space to be filled with ice-making water; a cooler configured to make ice by supplying a chill to the ice-making water filled in the space; a heater configured to generate heat; a heating ice-separator extended from above a water surface of the ice-making water toward a bottom of the ice making container, immersed in the ice-making water, configured to transfer heat from the heater to the ice-making water, and rotatable to separate the made ice; and a rotation driver configured to rotate the heating ice-separator.

According to other embodiment of the disclosure, there is provided an ice maker including: a main body comprising an ice-making compartment; an ice making container comprising at least one ice-making cell to be filled with ice-making water; a heating ice-separator extended from above a water surface of the ice-making water toward a bottom of the ice-making cell so as to be immersed in the ice-making water, configured to transfer heat to the ice-making water, and rotate to separate from the ice-making cell for separating ice; a heater configured to supply heat to the heating ice-separator; a cooler configured to supply a chill to the ice-making compartment; and a controller configured to control power supplied to the heater.

The ice maker may further include an ice making fan configured to circulate the chill transferred to the ice-making water of the ice making container.

The controller may change an output of the heater for a predetermined period of time, thereby making ice with a high transparency.

The controller may control the heater to be turned on or off a plurality of times for a predetermined period of time, thereby making ice with a high transparency.

BRIEF DESCRIPTION OF THE DRAWINGS

The above and/or other aspects will become apparent and more readily appreciated from the following description of exemplary embodiments, taken in conjunction with the accompanying drawings, in which:

FIG. 38 is a table showing clear-ice making results according to heating time and power on/off periods of a heater.

DETAILED DESCRIPTION OF EXEMPLARY EMBODIMENTS

Below, embodiments of the disclosure will be described in detail with reference to accompanying drawings so as to be easily actualized by a person having an ordinary skill in the art. The disclosure may be achieved in various different forms without being limited to the embodiments set forth herein. For clarity of description, like numerals refer to like elements throughout.

An ice maker 1 according to an embodiment of the disclosure includes a refrigerator having a refrigerating compartment and a freezing compartment capable of freezing ice, a freezer having a freezing compartment dedicated to making ice, and an ice machine dedicated to making ice. Further, the ice maker 1 according to an embodiment of the disclosure may include am upright refrigerator or built-in premium freezer of an indirect or direct cooling type.

Below, an overall structure for the refrigerator will be described with reference to FIGS. 1 and 2.

Figure 1:
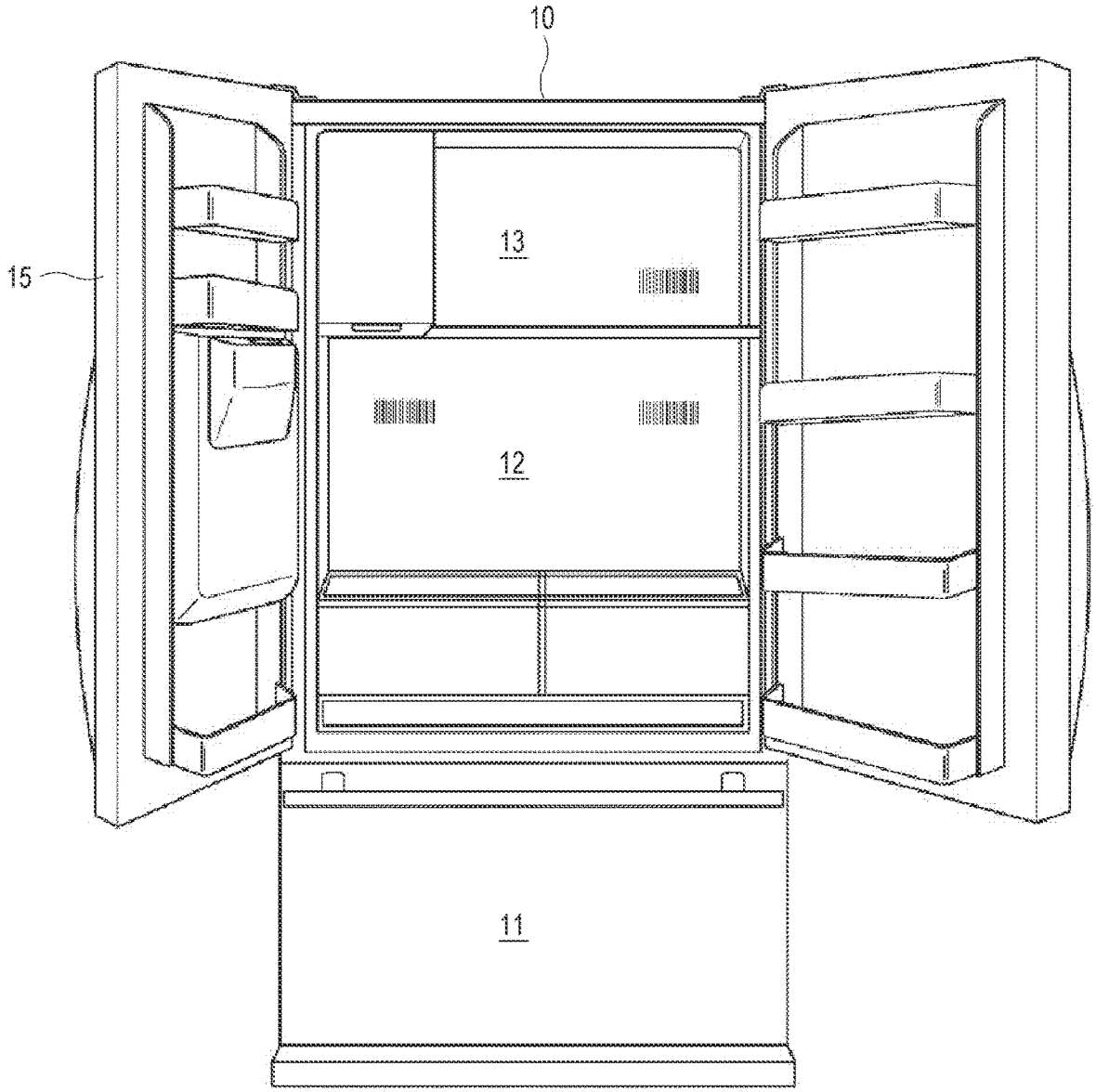
FIG. 1 is a font view showing an upright refrigerator according to an embodiment of the disclosure, of which doors are open.
Figure 2:
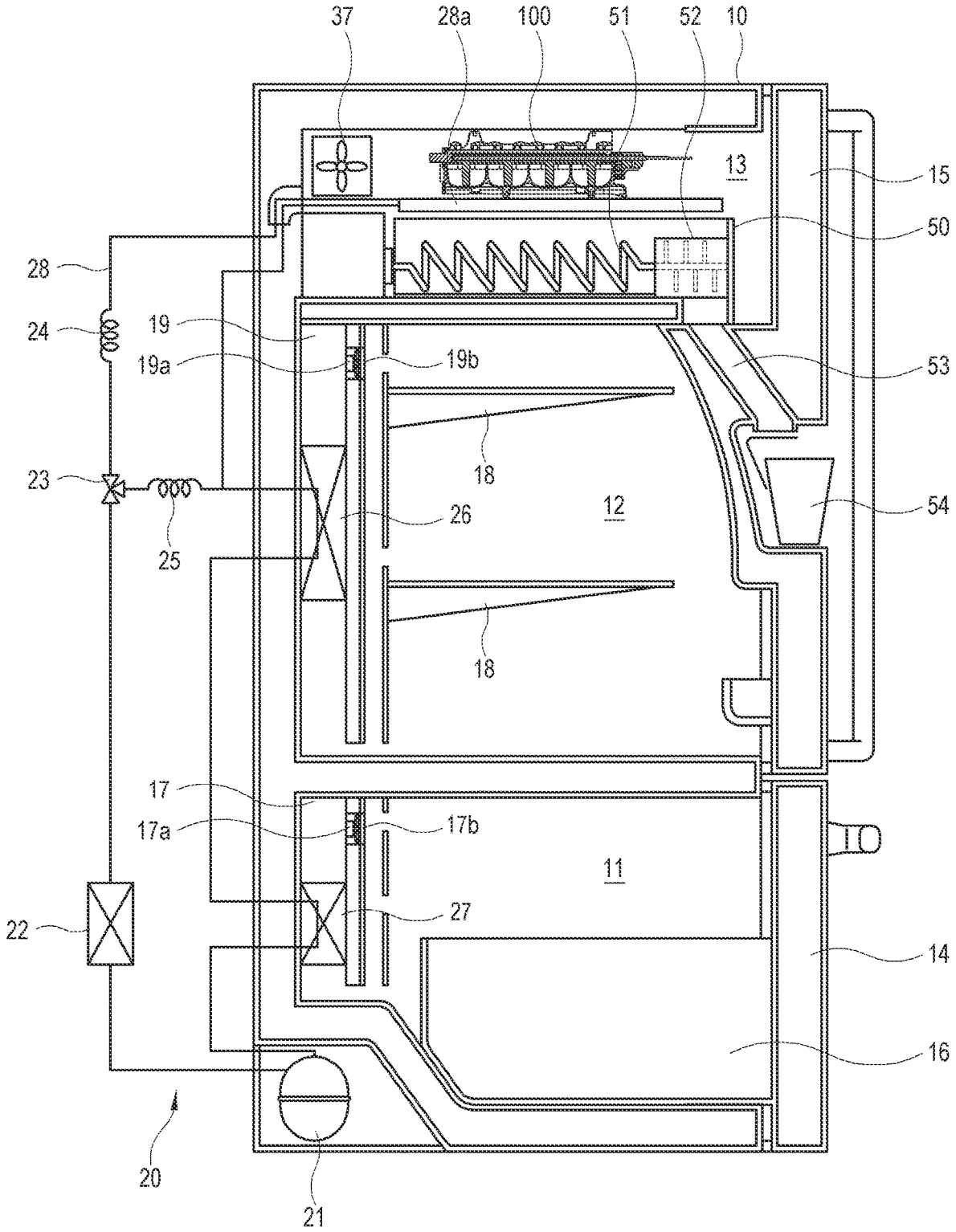
FIG. 2 is a section view showing a lateral section of an upright refrigerator according to an embodiment of the disclosure.

FIGS. 1 and 2 are a front view and a lateral section view of the refrigerator according to an embodiment of the disclosure, of which doors are open, respectively.

As shown in FIGS. 1 and 2, the refrigerator includes a main body 10 having a freezing compartment 11, a refrigerating compartment 12 and an ice-making compartment 13; a freezing compartment door 14 for opening and closing the freezing compartment 11; a refrigerating compartment door 15 for opening and closing the refrigerating compartment 12; and a cooler 20 for supplying a chill to the freezing compartment 11, the refrigerating compartment 12 and the ice-making compartment 13.

A user opens the freezing compartment door 14 and put a storage thing in the freezing compartment 11. The freezing compartment 11 may be provided with a freezing box 16, so that a user can put storage things in the freezing box 16.

The freezing compartment 11 may be provided with a first cool-air supply duct 17 in a rear wall thereof. In the first cool-air supply duct 17, there may be installed a freezing-compartment evaporator 27 of the cooler 20, a freezing fan 17a, and a freezing-compartment cool-air outlet 17b. The freezing fan 17a is capable of supplying a chill, which has been subjected to heat exchange by the freezing-compartment evaporator 27, to the freezing compartment 11 via the freezing-compartment cool-air outlet 17b.

A user may open the refrigerating compartment door 15 to put a storage thing in the refrigerating compartment 12. The refrigerating compartment 12 may be provided with a plurality of racks 18, so that a user can put storage things on each rack 18, thereby keeping the storage things refrigerated.

The refrigerating compartment 12 may be provided with a second cool-air supply duct 19 in a rear wall thereof. In the second cool-air supply duct 19, there may be installed a refrigerating-compartment evaporator 26 of the cooler 20, a refrigerating fan 19a, and a refrigerating-compartment cool-air outlet 19b. The refrigerating fan 19a is capable of supplying chill, which has been subjected to heat exchange by the refrigerating-compartment evaporator 26, to the refrigerating compartment 12 via the refrigerating-compartment cool-air outlet 19b.

The ice-making compartment 13 is partitioned from the refrigerating compartment 12 by an ice-making compartment casing that forms a predetermined space therein, and thus formed as insulated from the refrigerating compartment 12.

The ice-making compartment 13 may be provided with an ice making unit 100 for making ice, and an ice storage container 50 for storing the ice made by the ice making unit 100. The ice made by the ice making unit 100 may be stored in the ice storage container 50, and the ice stored in the ice storage container 50 may be transferred to an ice crusher 52 by a transferrer 51. The ice crushed by the ice crusher 52 may be supplied to a dispenser 54 via an ice discharging duct 53.

The ice making unit 100 may be installed with at least a part of a coolant pipe 28 of the cooler 20. A direct cooler 28a of the coolant pipe 28 in the cooler 20 may be inserted in the ice-making compartment 13, and the direct cooler 28a of the coolant pipe 28 inserted in the ice-making compartment 13 may be installed in the ice making unit 100. The direct cooler 28a of the coolant pipe 28 may be in direct contact with the ice making unit 100 and thus directly cool the ice making unit 100.

Further, the ice-making compartment 13 may be installed with an ice making fan 37 for circulating air therein. The ice making fan 37 forcibly makes air in the ice-making compartment 13 flow toward the direct cooler 28a of the coolant pipe 28 or the ice making unit 100, so that the air in the ice-making compartment 13 can be cooled by exchanging heat with the direct cooler 28a of the coolant pipe 28 or the ice making unit 100.

The cooler 20 may include a compressor 21, a condenser 22, a switching valve 23, a first expansion valve 24, a second expansion valve 25, the refrigerating-compartment evaporator 26, the freezing-compartment evaporator 27, and the coolant pipe 28.

The coolant pipe 28 may connect the compressor 21, the condenser 22, the first expansion valve 24, the second expansion valve 25, the refrigerating-compartment evaporator 26, and the freezing-compartment evaporator 27. Coolant flowing in the coolant pipe 28 is discharged from the compressor 21, passes through the condenser 22 and the second expansion valve 25, and is supplied to the refrigerating-compartment evaporator 26 and the freezing-compartment evaporator 27. The coolant supplied to the refrigerating-compartment evaporator 26 exchanges heat with air in the refrigerating compartment 12 and cools the air in the refrigerating compartment 12, and the coolant supplied to the freezing-compartment evaporator 27 exchanges heat with air in the freezing compartment 11 and cools the air in the freezing compartment 11. Further, the coolant flowing in the coolant pipe 28 comes out of the first expansion valve 24, passes through the direct cooler 28a of the ice-making compartment 13, and is supplied to the refrigerating-compartment evaporator 26 and the freezing-compartment evaporator 27 in sequence.

FIG. 2 illustrates the direct cooling type that the coolant directly passes through the direct cooler 28a of the coolant pipe 28, but the indirect cooling type where coolant passes through the ice-making compartment evaporator is also possible.

Figure 3:
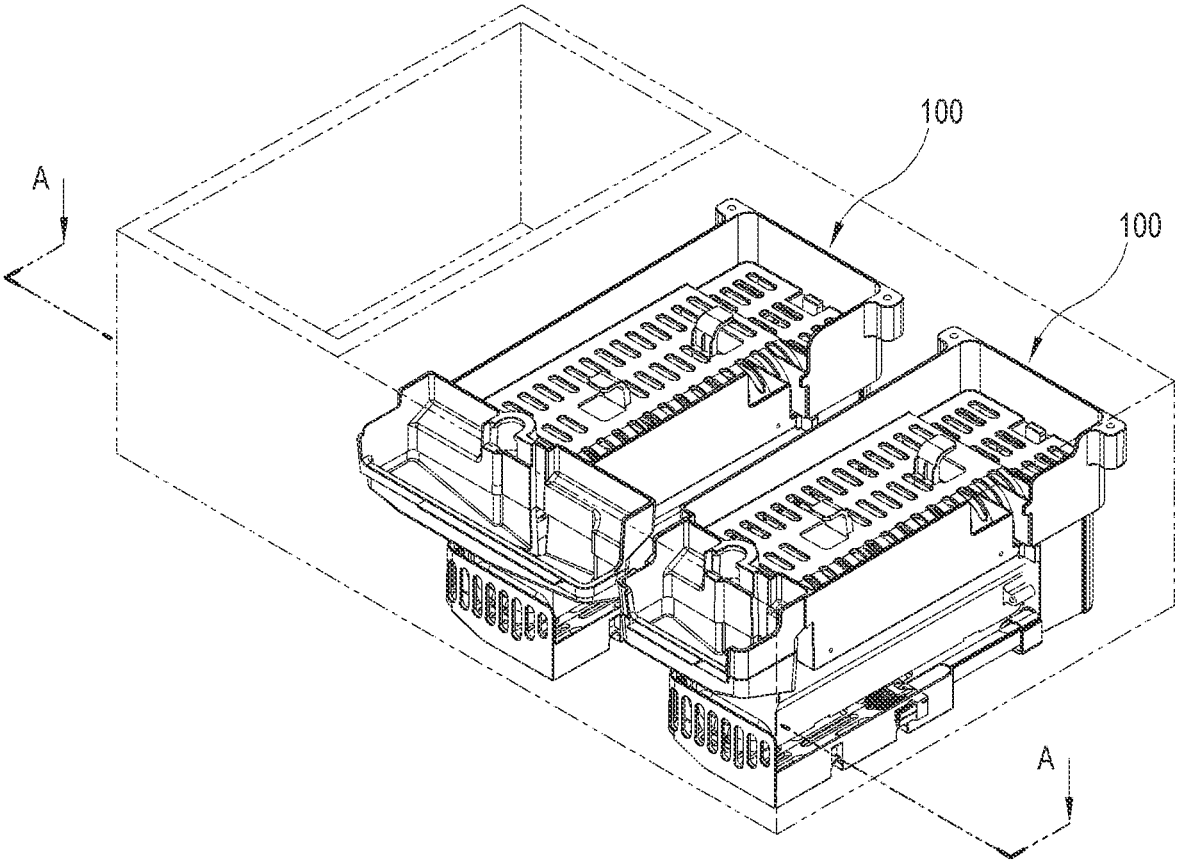
FIG. 3 is a schematic perspective view of a built-in freezer according to an embodiment of the disclosure.
Figure 4:
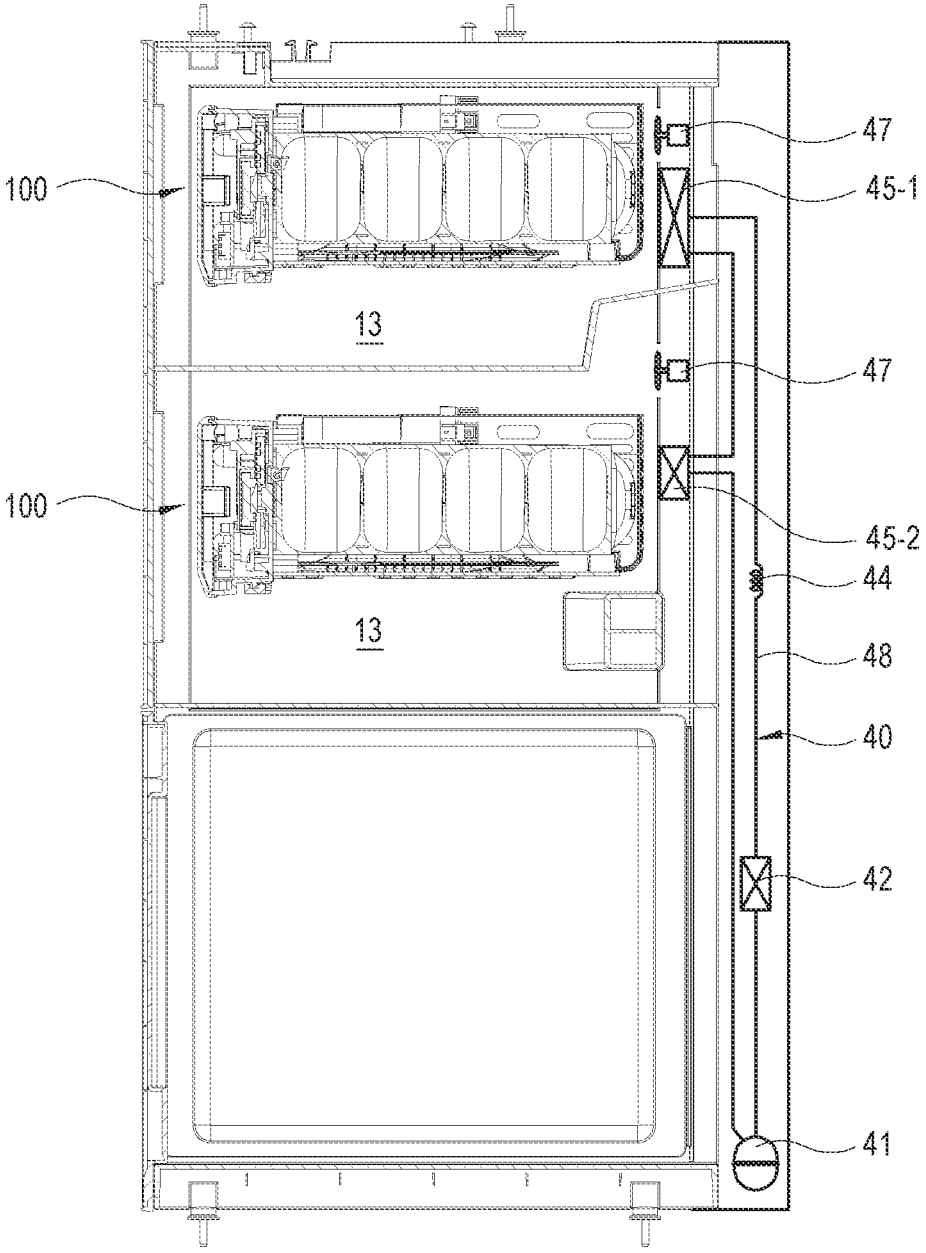
FIG. 4 is a section view showing a section of a built-in freezer according to an embodiment of the disclosure.
Figure 5:
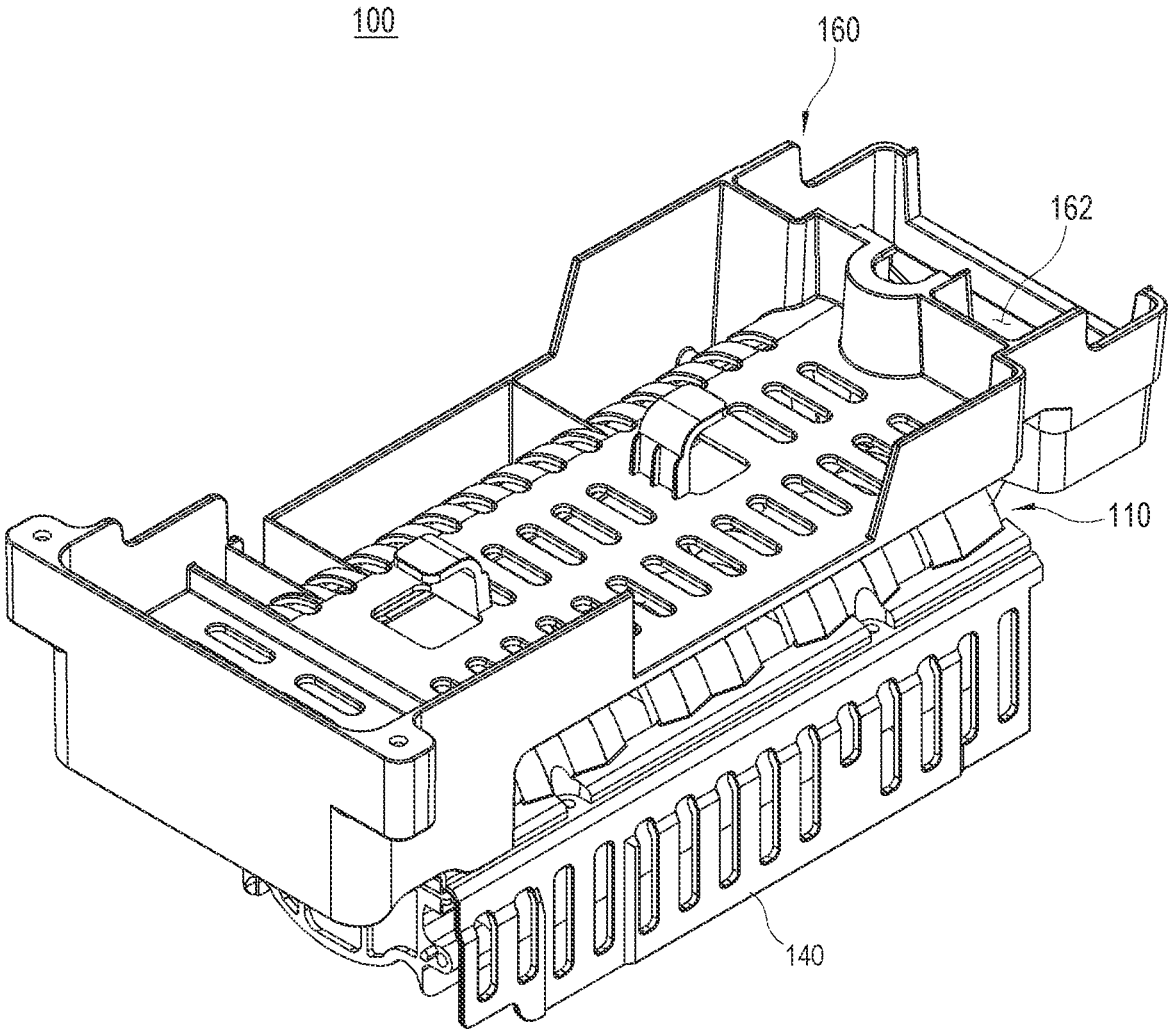
FIG. 5 is a perspective view of an ice maker mounted to an ice-making compartment according to an embodiment of the disclosure.
Figure 6:
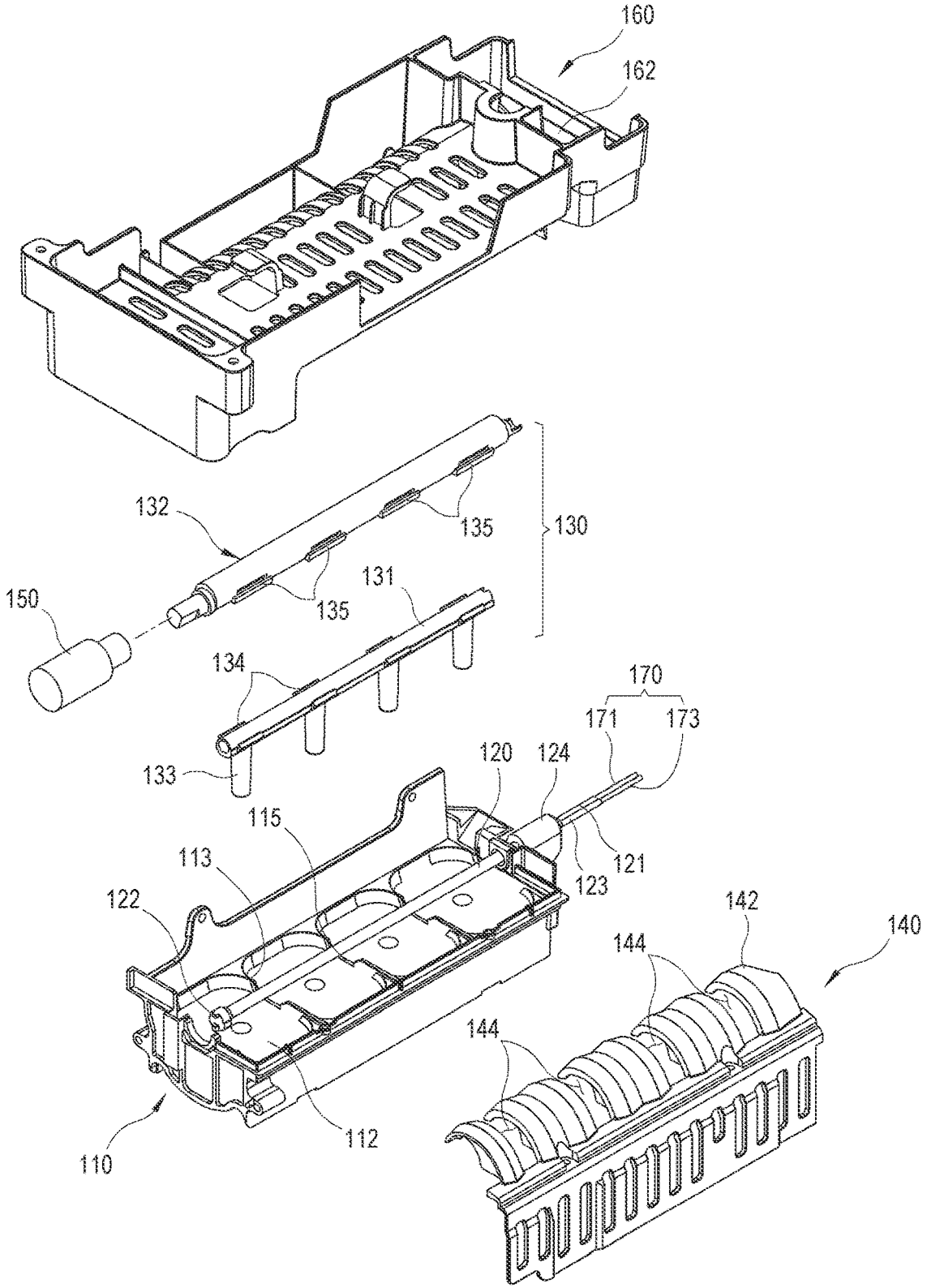
FIG. 6 is an exploded perspective view of an ice maker according to an embodiment of the disclosure.

FIGS. 3 and 4 are a schematic perspective view and a schematic section view of a built-in premium freezer. The built-in premium freezer is generally of the indirect cooling type, but may be of the direct cooling type. As compared with the upright refrigerator, like numerals refer to like elements and repetitive descriptions thereof will be avoided.

As shown in FIGS. 3 and 4, the freezer includes a cooler 40 applied to the inside of the ice-making compartment 13, at least one ice making fan 47, and two ice making units 100.

The ice-making compartment 13 is mounted with two ice making units 100 for making ice, and receives chill supplied from an evaporator 45 through the ice making fan 37. Under the two ice making units 100, an ice storage container (not shown) for receiving separated ice is arranged. As an ice-making water supplier, two ice-making water-supplying pipes (not shown) for supplying ice-making water to two ice making units 100 are introduced into the ice-making compartment 13. The ice-making water supplied by the ice-making water-supplying pipe may be subjected to pretreatment such as filtering, sterilization, etc.

The cooler 40 includes a compressor 41, a condenser 42, an expansion valve 44, first and second evaporators 45-1 and 45-2, and a coolant pipe 48. The first and second evaporators 45-1 and 45-2 are respectively arranged in two ice-making compartments 13 to cool each of the ice-making compartments 13. Of course, only one evaporator may be provided when two ice making units 100 are arranged in one ice-making compartment 13. The coolant pipe 48 connects the condenser 42, the expansion valve 44, and the evaporators 45-1 and 45-2. Coolant flowing in the coolant pipe 48 is discharged from the compressor 41, passes through the condenser 42 and the expansion valve 44, and is supplied to the evaporators 45-1 and 45-2. In the evaporators 45-1 and 45-2, the coolant exchanges heat with air in the ice-making compartment 13 and cools the air in the ice-making compartment 13.

The ice making fan 47 is arranged in each of the two ice-making compartments 13 and forcibly circulates the air cooled by the evaporators 45-1 and 45-2, thereby lowering each temperature of the ice-making compartments 13.

The ice making unit 100 refers to a device for making ice with the cooled air. Usually, one of the two ice making units 100 is used for making clear ice, and the other one is used for quickly making ice. According to situations, both the two ice making units 100 may be used in clear ice making or quick ice making.

FIGS. 5 to 9 are a perspective view, an exploded perspective view, a longitudinal-section view, a cross-section view and a planar-section view of the ice making unit 100 according to a first embodiment of the disclosure.

As shown therein, the ice making unit 100 includes an ice making container 110 having a space to be filled with ice-making water; a heater 120 for supplying heat; a heating ice-separator 130 immersed in the ice-making water as extended from above the water surface of the ice-making water toward the bottom of the ice making container 110, transferring heat from the heater to the ice-making water while cooling the ice-making water, and rotatable while separating ice; an ice-separation guider 140; a rotation driver 150 for rotating the heating ice-separator 130 to separate the made ice; a container supporter 160; and an electric cable 170 for supplying power to the heater 120.

The ice making container 110 is made of a material having high thermal conductivity, e.g. aluminum. The ice making container 110 refers to an ice-making tray that may for example include four ice-making cells 112 partitioned by a partition wall 113 and arranged in parallel. The partition wall 113 includes an overflow allowing portion 115 via which the ice-making water overflows into an adjacent ice-making cell 112. Each ice-making cell 112 has an unrestricted hemispheric inner surface.

The heater 120 is made of a material that generates heat due to resistance when receiving power through the electric cable 170, for example, tungsten. The heater 120 includes a first heating wire 121 and a second heating wire 123 to which (+) power and (−) power are applied. The electric cable 170 includes a first electric cable 171 and a second electric cable 172 respectively connected to the first heating wire 121 and the second heating wire 123. The first heating wire 121 and the second heating wire 123 are connected to each other at the end thereof and generate heat due to resistance when (+) power and (−) power are applied. The heater 120 is extended from an upper middle of the ice-making cell 112 along an arranged direction of the ice-making cell 112 and supported on the ice making container 110. The heater 120 has one side fastened by a heater cap 122, and the other side fastened by a heater holder 124. The heater 120 may be coated or sheathed with a material having high thermal conductivity or may be inserted in a metal pipe having high thermal conductivity. Here, the heater 120 is stationary and serves as the center for rotating the heating ice-separator 130. Alternatively, the heater 120 may be designed to be not stationary but rotate together with the heating ice-separator 130.

According to another embodiment, the heater 120 may repeat rotating clockwise or counterclockwise together with the heating ice-separator 130, for example, by 360 degrees when ice is made and separated. In this case, the electric cable 170 also repeats alternating between twisted and untwisted by the rotation of the heater 120, and is thus degraded in durability.

Figure 10:
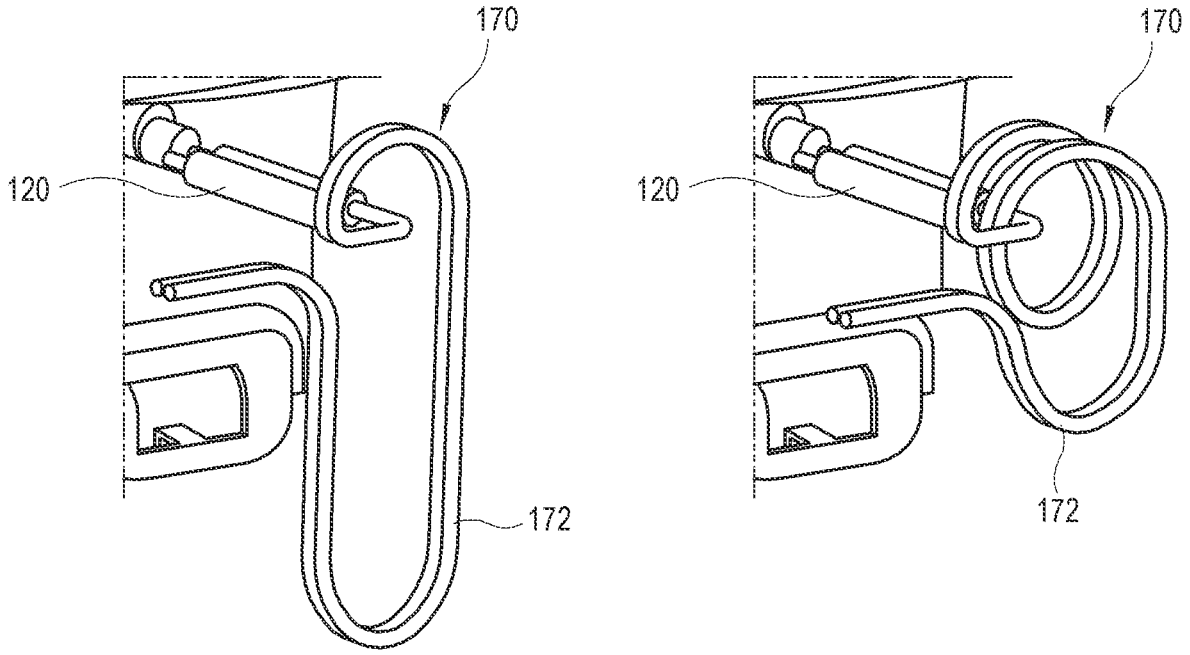
FIG. 10 is a view showing an electric cable connected to a heater of FIG. 6 when ice is made and separated.

FIG. 10 is a view showing the electric cable 170 connected to the heater 120 when ice is made and separated. As shown therein, the electric cable 170 is extended in a transverse direction to the lengthwise direction of the heater 120, i.e. in a rotating direction and wound one or more times with respect to the heater 120 on an initial state in a case of making ice. In this case, the electric cable 170 includes an extra electric cable 172 that is not wound but sags so as to be additionally wound when the heater 120 rotates in a case of separating ice. In the case of separating ice, the extra electric cable 172 of the electric cable 170 is wound as the heater 120 rotates in a forward direction. In a case of making ice again, the extra electric cable 172 of the electric cable 170 is unwound and sags as the heater 120 rotates in a reverse direction. Like this, the electric cable 170 is structured to be smoothly wound and unwound as the heater 120 rotates in the forward and reverse directions in the cases of making ice and separating the ice. Besides the structural design of the electric cable, a flexible material such as silicon, Teflon, etc. may be used for the sheath of the electric cable 170 to thereby further improve durability. Further, when an actuator for winding and unwinding the electric cable is designed, the radius of curvature that the electric cable 170 has may be increased to thereby improve the durability. Such a structure for smoothly winding and unwinding the electric cable 170 leads to decrease in a core wire, for example, from 0.16φ to 0.08φ.

The heating ice-separator 130 includes rotary shafts 131 and 132 having a hollow, and a heating rod 133 for heating the ice-making water in the ice-making cell 112.

The rotary shafts 131 and 132 include a first rotary shaft 131 and a second rotary shaft 132 which can be coupled to and separated from each other. The second rotary shaft 132 couples with the first rotary shaft 131 and transfers rotary power. The rotary shaft is not limited to such a structure separable into the first rotary shaft 131 and the second rotary shaft 132, but may be manufactured as a single body.

The first rotary shaft 131 has the hollow in which the heater 120 is inserted or supported. The first rotary shaft 131 is inserted leaving a first air gap G1 from the heater 120. The first rotary shaft 131 and the heating rod 133 may be formed as a single body of a metal material having high thermal conductivity. The first rotary shaft 131 includes at least one pair of opposite hooks 134 on the outer circumferential surface thereof to be hooked to the second rotary shaft 132. Each hook 134 protrudes upward from the outer circumstance of the first rotary shaft 131, is elastically transformable, and has a projection at the end thereof.

The second rotary shaft 132 lengthwise couples with the first rotary shaft 131, and connects with the rotation driver 150 at one end thereof to receive rotation power. The second rotary shaft 132 is coupled leaving a semicircular second air gap G2 from the first rotary shaft 131 and the heater 120. The second air gap G2 prevents heat of the internal heater 120 from being transferred from the upper portion of the first rotary shaft 131 to the second rotary shaft 132. The second rotary shaft 132 includes at least one pair of hook holders 135 on the outer circumferential surface thereof to which the hook 134 of the first rotary shaft 131 is hooked. Each pair of hook holders 135 includes a projection holder extended left and right from the outer circumferential surface of the second rotary shaft 132. The hook 134 of the first rotary shaft 131 is hooked as fitted to the projection holder of the hook holder 135. The second rotary shaft 132 is made of a material, which has low thermal conductivity and of which injection molding is possible, for example, plastic. The second rotary shaft 132 may be omitted as necessary, and the first rotary shaft 131 may directly receive power from the rotation driver 150.

Such hook coupling between the first rotary shaft 131 and the second rotary shaft 132 is merely an example. Alternatively, the first rotary shaft 131 and the second rotary shaft 132 may be coupled by various methods, for example, adhesive (glue), forcible fitting, screw, etc.

The heating rod 133 is shaped like a stick, for example, a cylindrical shape, but not limited to this shape. The heating rod 133 is extended as a single body from the first rotary shaft 131 and for example perpendicular to the lengthwise direction of the first rotary shaft 131. The heating rod 133 is extended from above the water surface of the ice-making water toward the bottom of the ice-making cell 112 and immersed into the ice-making water. For example, to be immersed in the ice-making water, at least a distal end of the heating rod 133 extends into the ice-making water, as shown for example, in various of the figures. The heating rod 133 may be extended to the bottom of the ice-making cell 112. However, the heating rod 133 has to leave a space so as to properly rotate without interfering with the inner surface of the ice-making cell 112. Here, the heating rod 133 is provided as a single body in the first rotary shaft 131, but not limited to this description. Alternatively, the heating rod 133 and the first rotary shaft 131 may be designed to be separately manufactured and coupled.

The ice-separation guider 140 is made of a material of which injection molding is possible, for example, plastic. The ice-separation guider 140 includes an ice-separation guide 142 having four ice-separation slots 144 through which four heating rods 133 passes during rotation. The ice-separation guide 142 is extended from the edge of the ice making container 110 toward the second rotary shaft 132 within the radius of curvature for the heating rod 133. The ice-separation guider 140 is coupled to a lateral side of the ice making container 110 and guides ice separated by the rotation of the heating ice-separator 130 to be discharged. The ice-separation guide 142 has an arc shape of which the radius of curvature gradually increases from an end portion adjacent to the second rotary shaft 132 toward the edge of the ice making container 110. In result, the heating rod 133, which has been inserted in the ice to be separated, is gradually separated from the ice while passing by the arc-shaped ice-separation guide 142.

The rotation driver 150 is coupled to one end of the second rotary shaft 132 and supplies power so that the second rotary shaft 132 can repeat alternating between forward rotation and reverse rotation. The rotation driver 150 may be actualized by a stepping motor, and a cam (not shown) may be connected to a driving shaft (not shown) for power transmission.

The container supporter 160 is made of a material of which injection molding is possible, for example, plastic. The container supporter 160 is arranged to cover the top of the ice making container 110 and fastened to the inner wall of the ice-making compartment 13. The container supporter 160 is coupled to and supports the ice making container 110. The container supporter 160 includes a cup 162 for holding the ice-making water supplied through the ice-making water-supplying pipe. The cup 162 supplies the ice-making water to the first ice-making cell 112 adjacent to the lower ice making container 110. When the first ice-making cell 112 is fully filled with the ice-making water, the ice-making water flows to the next ice-making cell through the overflow allowing portion 115. In this manner, the ice-making water is stepwise filled in all the ice-making cells. In a conventional ice maker, the cup for holding the ice-making water is integrally attached to the ice making container. In result, the cup having a predetermined volume additionally transfers a chill to the adjacent ice-making cell, and it is therefore difficult to control temperature for making clear ice in an ice-making cell adjacent to the cup among four ice-making cells. However, the ice making unit 100 according to an embodiment of the disclosure can control the plurality of ice-making cells to have uniform temperature because the cup is mounted to the upper container supporter 160.

When ice is made, ice formation starts on the surface of the ice-making cell 112 and the whole inner surface of the ice-making cell. In the heating ice-separator 130, the heating rod 133 has a rotatable structure and is extended from the center to the bottom of the ice-making cell 112 having the hemispheric inner surface. Because heat is transferred from the heating rod 133 to the ice-making water, ice formation starts at a position far away from the heating rod 133 as shown in FIG. 7.

Figure 11:
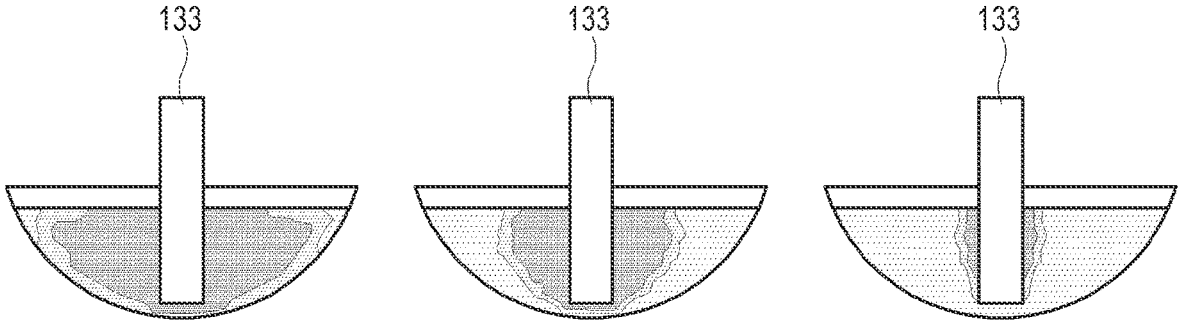
FIG. 11 is a view showing a simulation of a freezing process in an ice making container.

FIG. 11 is a view showing a stepwise simulation of a freezing direction in an ice making container. The first step is an ice-making induction period in which freezing starts from the water surface of the ice-making water and the edge of the ice-making cell 112. The second step is an ice growth period in which ice is formed in a single direction from the edge of the ice-making cell 112 toward the center, i.e. the heating rod 133, in other words, in a direction parallel to the water surface. The third step is a freezing stop period in which ice formation is finished around the heating rod 133, thereby completing the ice formation. In the ice making unit 100 according to an exemplary embodiment, the ice formation is performed from a position far away from the heating rod 133 toward the heating rod 133 in a single direction parallel to the water surface, and therefore it is possible to constantly control ice-making speed and induce clear ice.

Figure 12:
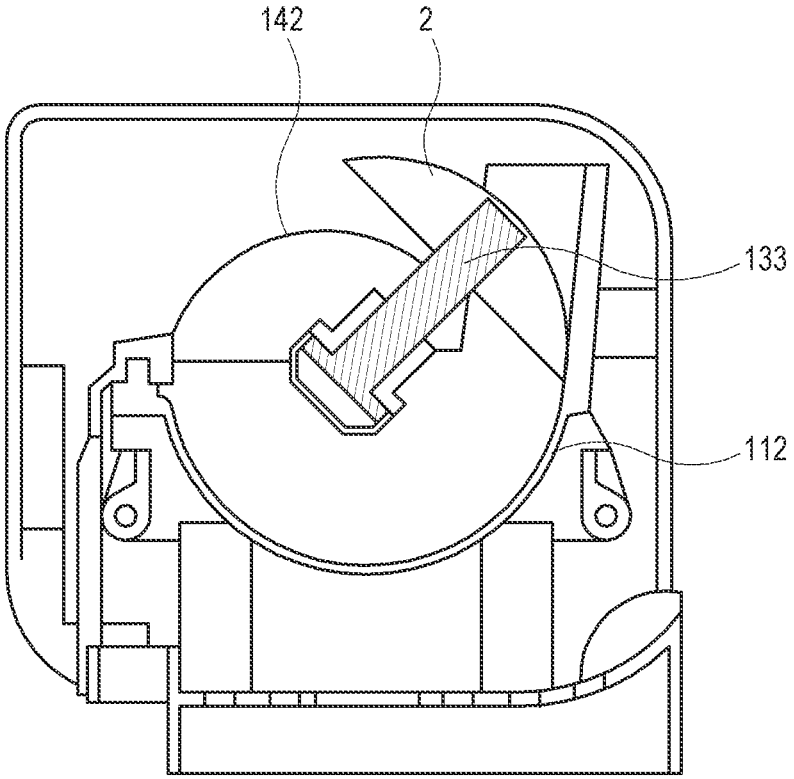
FIGS. 12 and 13 are views for explaining a process of separating ice made in the ice maker.
Figure 13:
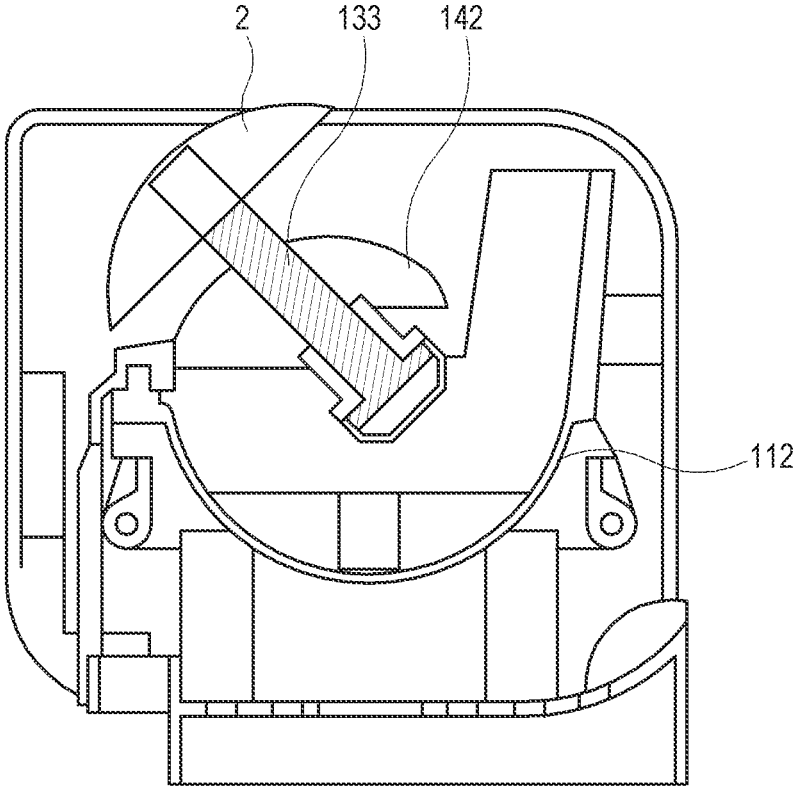

FIGS. 12 and 13 are views for explaining a process of separating ice in the ice making unit 100 according to an embodiment of the disclosure.

Figure 7:
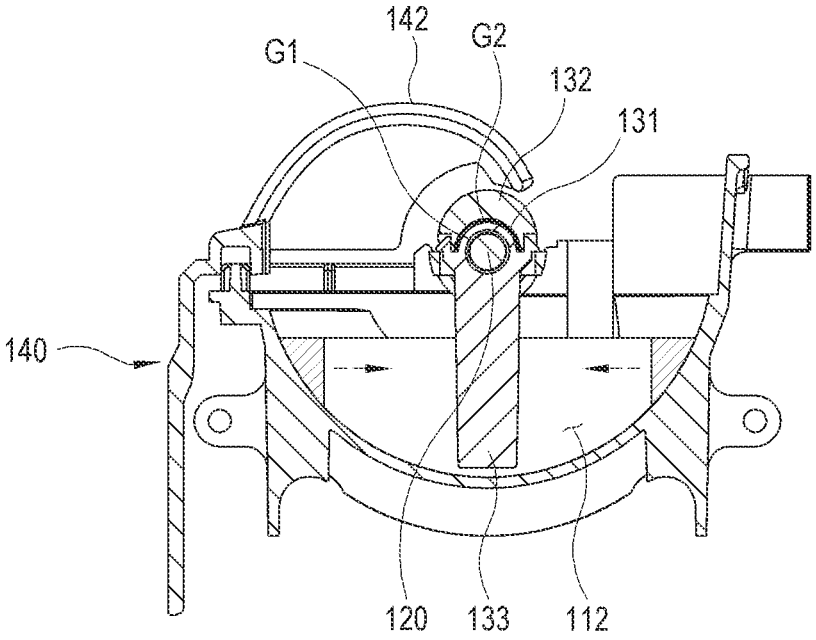
FIGS. 7 to 9 are a longitudinal-section view, a cross-section view and a planar section view of an ice making unit, respectively.
Figure 8:
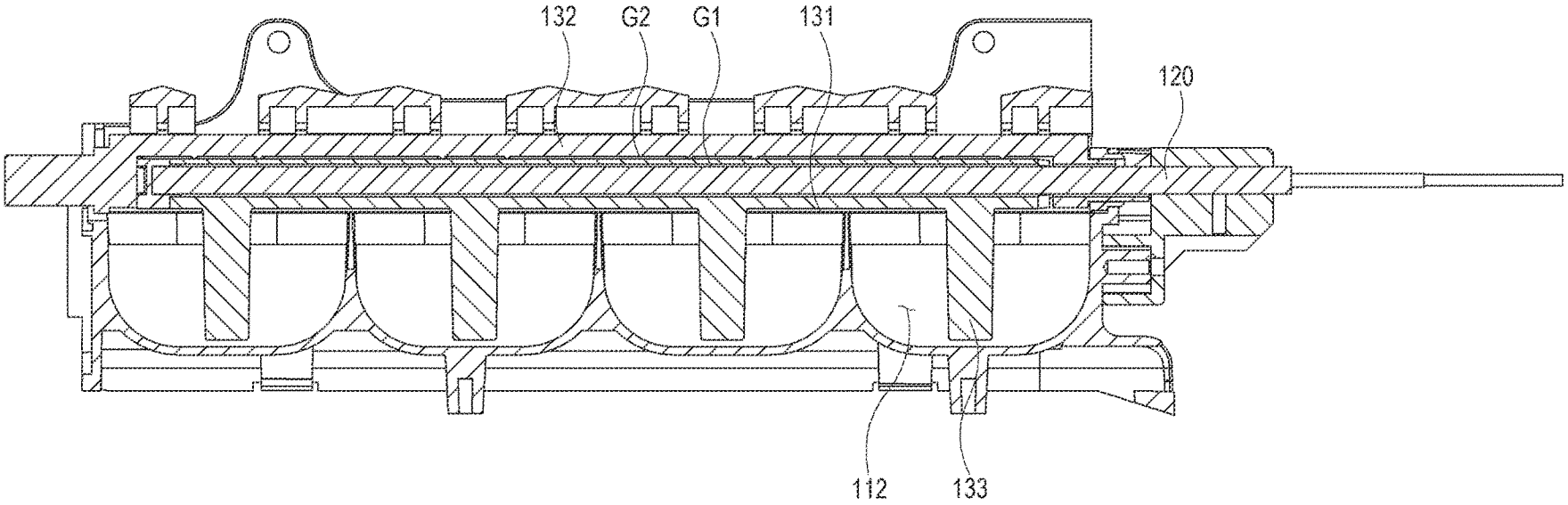
Figure 9:
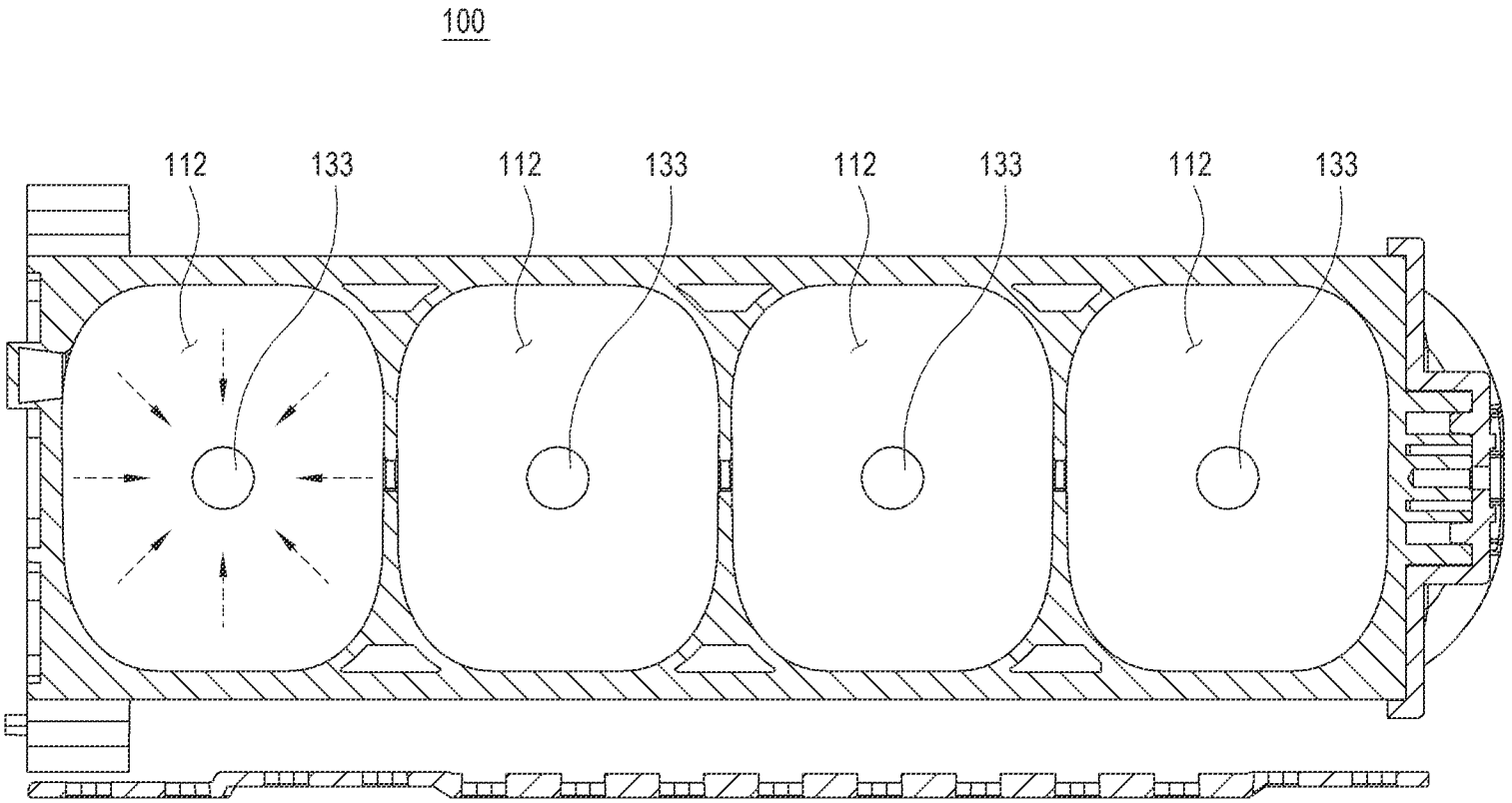

When ice making is completed, the heating rod 133 of the ice making unit 100 is inserted in the center of the ice as shown in FIG. 7. In this case, when the heating rod 133 rotates counterclockwise by the rotation of the rotation driver 150, the heating rod 133 is separated from the ice-making cell 112 as inserted in ice 2 as shown in FIG. 12. Then, as shown in FIG. 13, the ice 2 is completely separated from the ice-making cell 112 as the heating rod 133 further rotates to pass through the ice-separation guide 142 beyond the ice-separation slots 144. Like this, the heating rod 133 of the ice making unit 100 in this embodiment not only transfers heat to the ice-making water so that the ice formation can be induced in one direction to make ice transparent, but also serves as an ice ejector to separate the ice.

Figure 14:
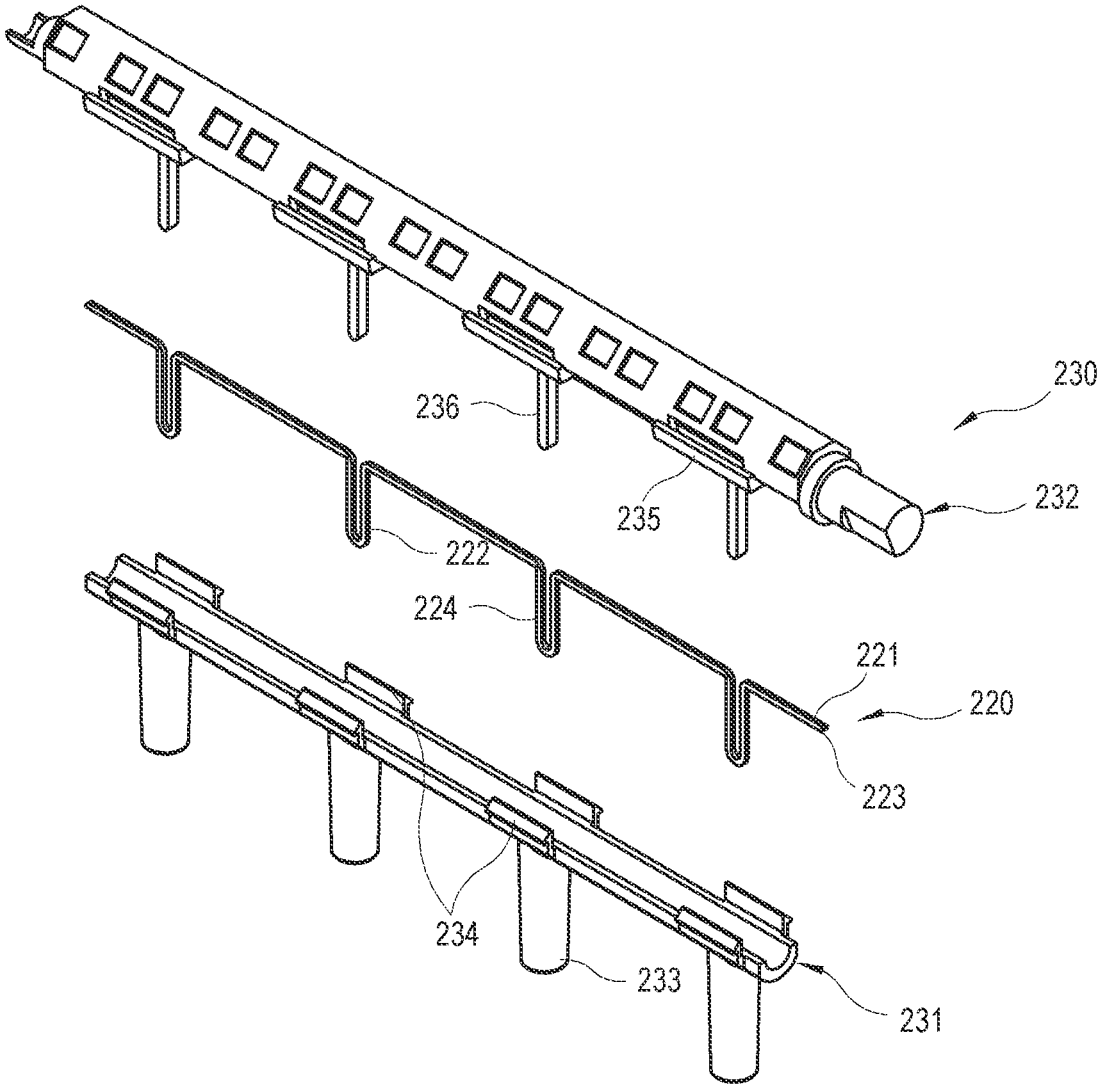
FIGS. 14 and 15 are views showing a structure of a heater and a heating ice-separator according to a second embodiment of the disclosure.
Figure 15:
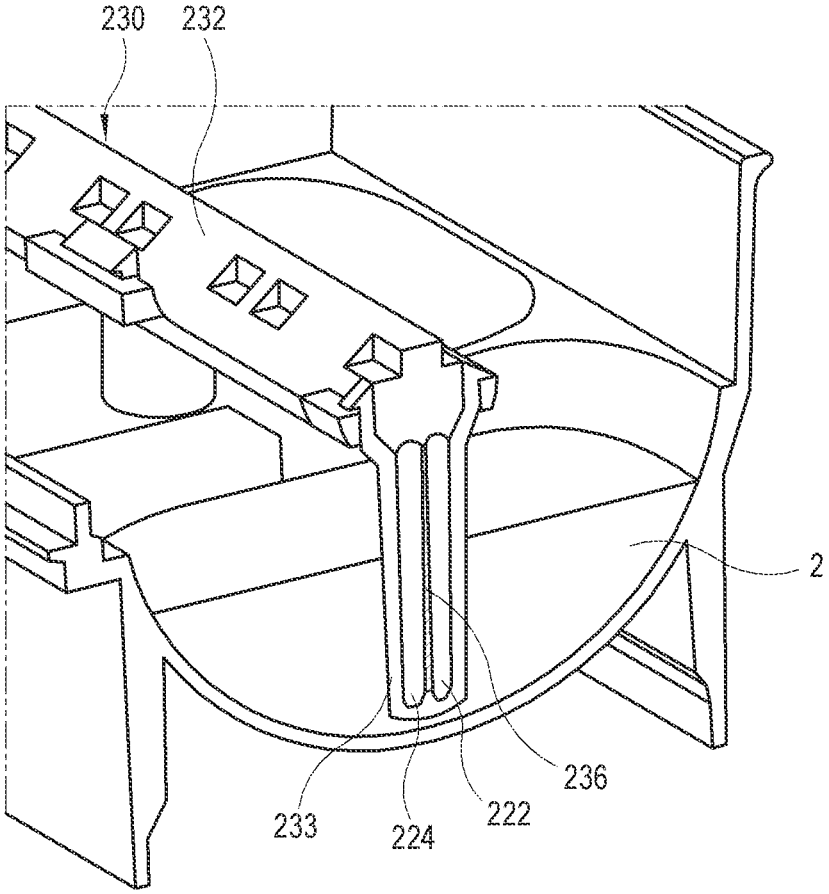

FIGS. 14 and 15 are views showing a structure of a heater 220 and a heating ice-separator 230 according to a second embodiment of the disclosure.

The heater 220 includes four bending portions 222 to be respectively inserted into hollows inside four heating rods 233. On the contrary to the conductive type of the foregoing embodiment, the bending portion 222 directly heats each heating rod 233. The heater 220 includes a first heating wire 221 and a second heating wire 223 which are made of a material such as tungsten or the like that generates heat based on resistance. The first heating wire 221 includes four first bending portions 222 bent having a 'U' shape respectively corresponding to four heating rods 233 while being extended along a lengthwise direction of a first rotary shaft 231. The second heating wire 223 includes four second bending portions 224 bent having a 'U' shape respectively corresponding to four heating rods 233 while being adjacent to the first heating wire 221 and extended along the lengthwise direction of the first rotary shaft 231. The first heating wire 221 and the second heating wire 223 are arranged to be adjacent to each other in parallel to form a pair, and connected to each other at the ends thereof to thereby generate heat based on resistance when (+) power and (−) power are respectively applied.

The heating ice-separator 230 includes the first rotary shaft 231 for example having a hollow semi-cylindrical shape, a second rotary shaft 232 coupled to the top of the first rotary shaft 231 along the lengthwise direction and transmitting rotation power, and the heating rod 233 integrally provided beneath the first rotary shaft 231 and extended downward.

On the semi-cylindrical inner surface of the first rotary shaft 231, the first heating wire 221 and the second heating wire 223 adjacent to each other are arranged. The first rotary shaft 231 includes at least one hook 234 to couple with the second rotary shaft 232.

The second rotary shaft 232 is made of plastic or the like material which has low thermal conductivity and of which injection molding is possible. The second rotary shaft 232 is coupled to the top of the first rotary shaft 231, receives rotary power from the rotation driver and provides the rotary power to the first rotary shaft 231. The second rotary shaft 232 includes at least one hook holder 235 to which a hook 234 of the first rotary shaft 231 is hooked. The second rotary shaft 232 includes four insertion projection 236 extended downward. The insertion projection 236 is inserted in the hollow of the heating rod 233 when the first rotary shaft 231 and the second rotary shaft 232 are coupled to each other. When the insertion projection 236 is inserted in the heating rod 233, the heating rod 233 holds and supports the first bending portion 222 of the first heating wire 221 and the second bending portion 224 of the second heating wire 223 within the hollow.

The heating rod 233 is extended downward from the bottom on the outer circumferential surface of the first rotary shaft 231. The heating rod 233 includes the hollow in which the first bending portion 222 of the first heating wire 221 and the second bending portion 224 of the second heating wire 223 are inserted.

Figure 16:
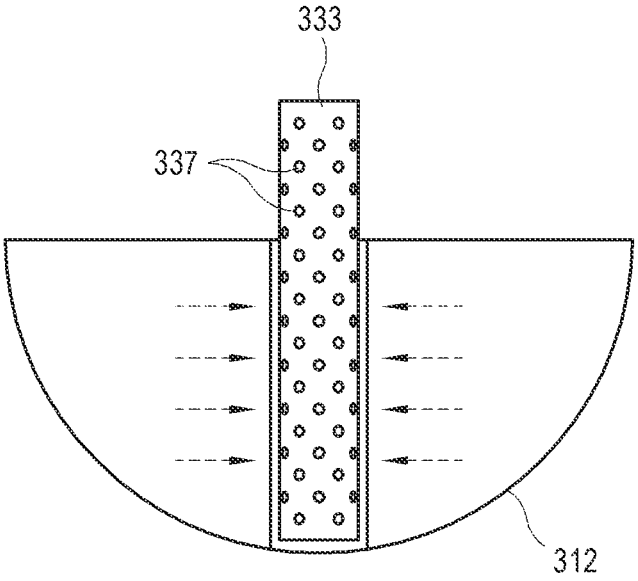
FIG. 16 is a view showing a structure of a heating ice-separator according to a third embodiment of the disclosure.

FIG. 16 is a view showing a structure of the heating rod 333 according to a third embodiment of the disclosure.

The heating rod 333 includes a plurality of pores 337 on the outer circumferential surface thereof. The pores 337 may be exposed to the outside along an inner passage (not shown) of the heating rod 333. The heating rod 333 may be extended from above the water surface of the ice-making water toward the bottom of the ice-making cell 312 and immersed in the ice-making water. As shown in FIG. 16, the ice formation in the ice-making cell 312 proceeds from the lateral side of the inner surface toward the center, i.e. the heating rod 333, and ultimately stops in the heating rod 333. In this case, air bubbles in the ice-making water enter the pores 337 of the heating rod 333 so that ice around the heating rod 333 can keep transparency. The heating rod 333 may be extended to the bottom of the ice-making cell 312. However, the end of the heating rod 333 has to be properly spaced apart from the inner surface of the ice-making cell 312 to smoothly rotate.

The outer circumferential surface of the heating rod 133, 233 or 333 may be subjected to hydrophilic treatment to prevent a white residue from being formed on the ice around the surface of the heating rod while completing the ice formation. As a method of applying the hydrophilic treatment to the outer circumferential surface of the heating rod 333, there may be a chemical process, ultraviolet radiation, oxygen plasma treatment, etc.

Figure 17:
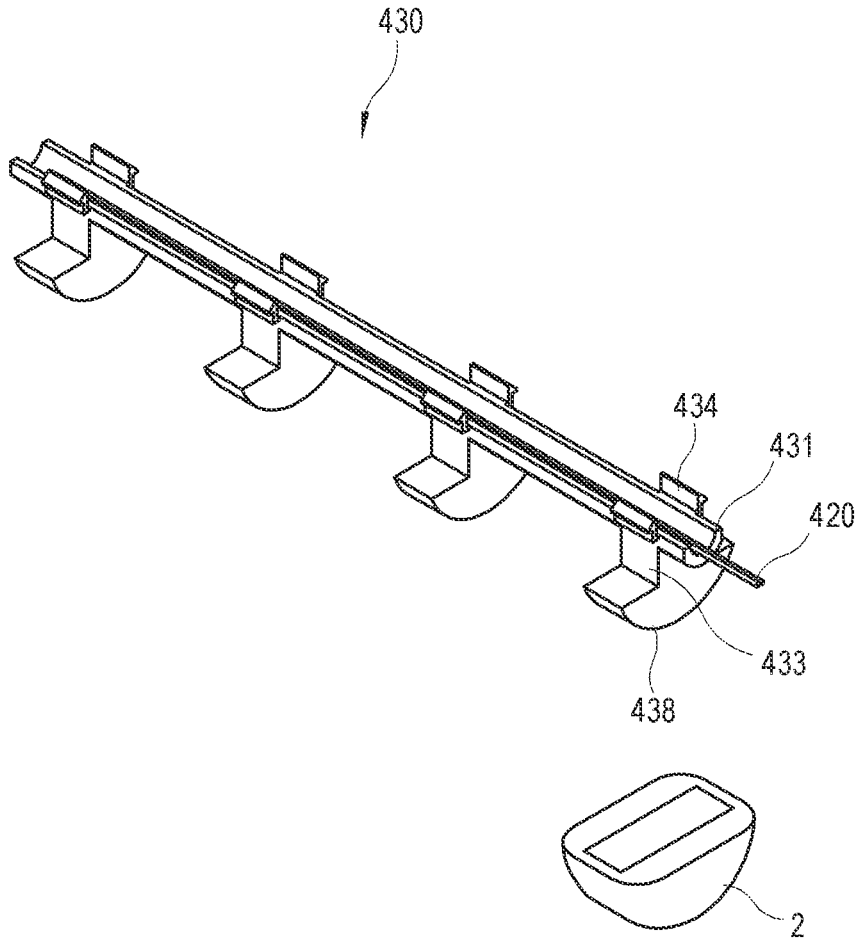
FIGS. 17 and 18 are views showing a structure of a heating ice-separator according to a fourth embodiment of the disclosure.
Figure 18:
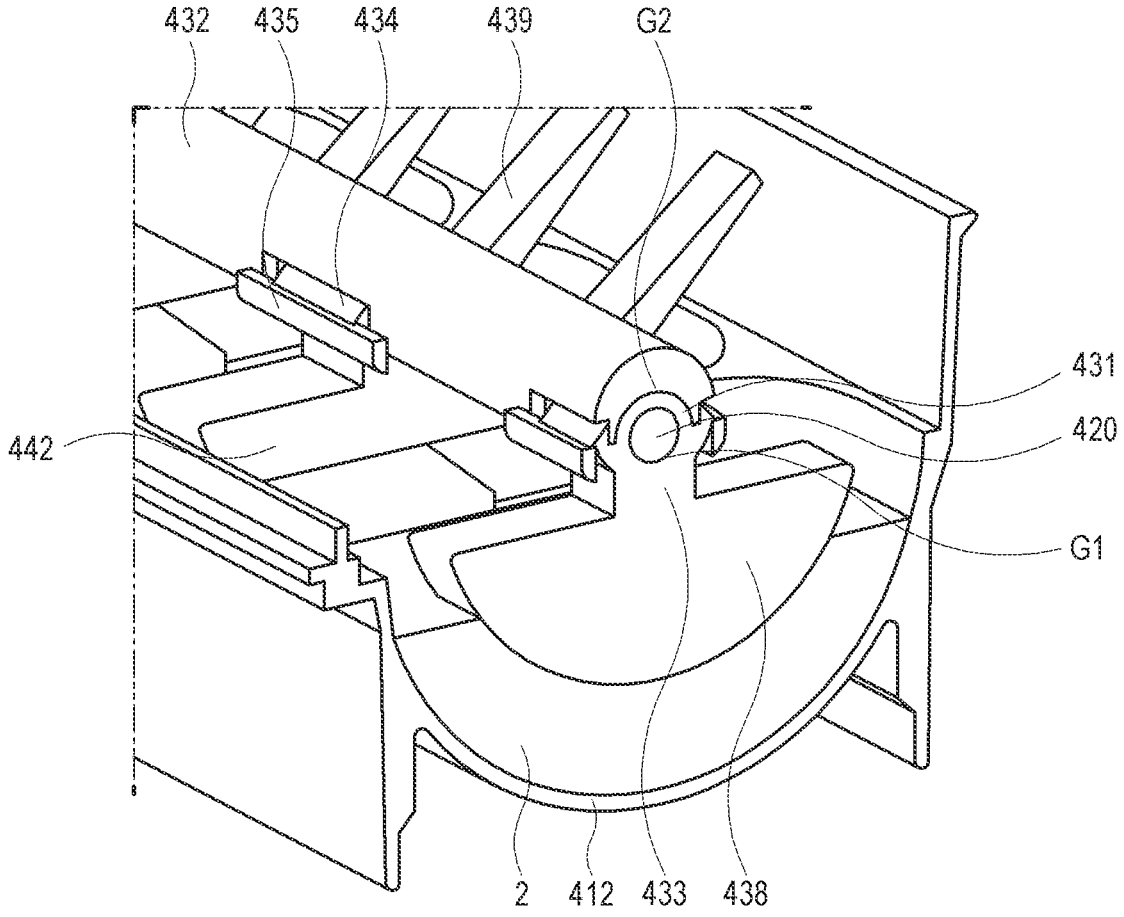

FIGS. 17 and 18 are views showing a structure of a heating ice-separator 430 according to a fourth embodiment of the disclosure.

The heating ice-separator 430 includes a first rotary shaft 431 having a hollow, a second rotary shaft 432 coupled to the first rotary shaft 431 and transmitting rotary power, and a heating rod 433 to be immersed downward from the outer circumferential surface of the first rotary shaft 431 to at the center of an ice-making cell 412.

The first rotary shaft 431 is shaped like a cylinder, and puts a heater 420 therein leaving a first air gap G1. The first rotary shaft 431 and the heating rod 433 may be provided as a single body and made of a metal material having high thermal conductivity. The first rotary shaft 431 includes at least one hook 434, which is hooked to the second rotary shaft 432, on the outer circumferential surface. Hook coupling between the first rotary shaft 431 and the second rotary shaft 432 is merely an example, and there may be usable various methods such as adhesive (glue), forcible fitting, screws, etc.

The second rotary shaft 432 has a semi-cylindrical shape and is coupled to the first rotary shaft 431 along a lengthwise direction leaving the second air gap G2. The second rotary shaft 432 connects with the rotation driver at one end thereof and receives rotary power. The second rotary shaft 432 includes four ejectors 439 for ejecting ice when the ice is separated. The ejectors 439 are rotated as the second rotary shaft 432 rotates. The second rotary shaft 432 include at least one hook holder 435 on the outer circumferential surface thereof, to which the hook 434 of the first rotary shaft 431 is hooked. The second rotary shaft 432 is made of a material which has low thermal conductivity and of which injection molding is possible, for example, plastic. The second rotary shaft 432 may be omitted as necessary, and the first rotary shaft 431 may directly receive the power from the rotation driver.

The heating rod 433 is integrally extended from the first rotary shaft 431 in a transverse direction, for example, in a perpendicular direction to the lengthwise direction of the first rotary shaft 431. The heating rod 433 includes a heating head 438 provided at an end portion thereof and shaped like a half moon (or an anchor). The heating head 438 includes an outer circumferential surface having curvature corresponding to curvature the inner surface of the ice-making cell 412 has. In result, the shortest distance is uniformly formed between the inner surface of the ice-making cell 412 and the outer circumferential surface of the heating head 438, so that ice formation starting from the inner surface of the ice-making cell 412 can be simultaneously finished throughout the outer circumferential surface of the heating head 438.

Figure 19:
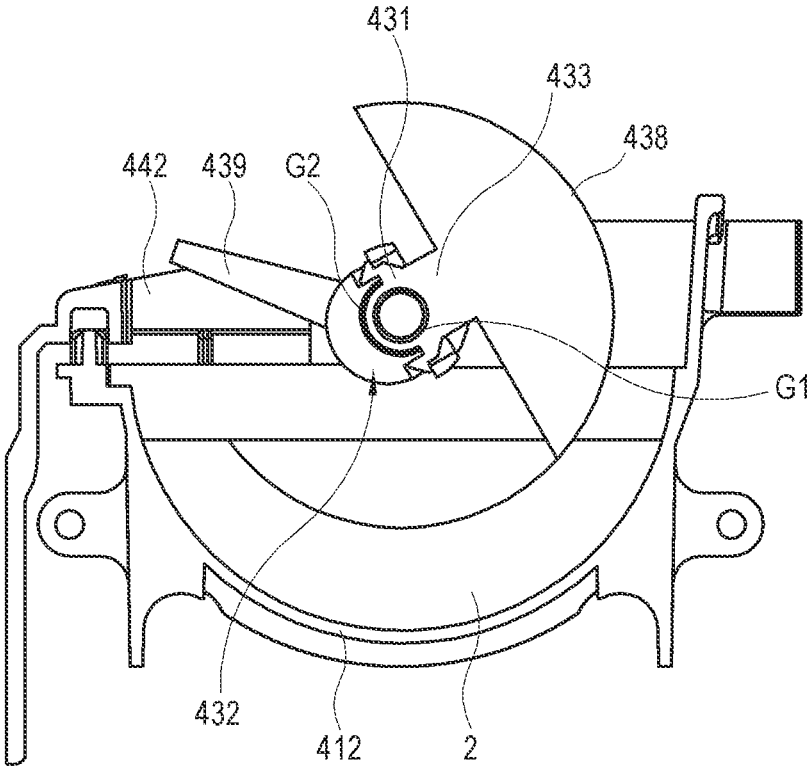
FIG. 19 is a view for explaining ice separation based on rotation of the heating ice-separator according to the fourth embodiment of the disclosure.

FIG. 19 is a view for explaining ice separation in the heating ice-separator 430 according to the fourth embodiment of the disclosure. As shown therein, when the second rotary shaft 432 rotates, the heating head 438 is separated from the ice 2 and at the same time the rotating ejector 439 pushes up the ice 2 from the ice-making cell 112. In this case, the ice-separation guide 442 does not need to have an arc shape to withdraw the heating rod, but may be shaped like a flat plate extended horizontally from the edge of the ice making container like that of a conventional one.

Figure 20:
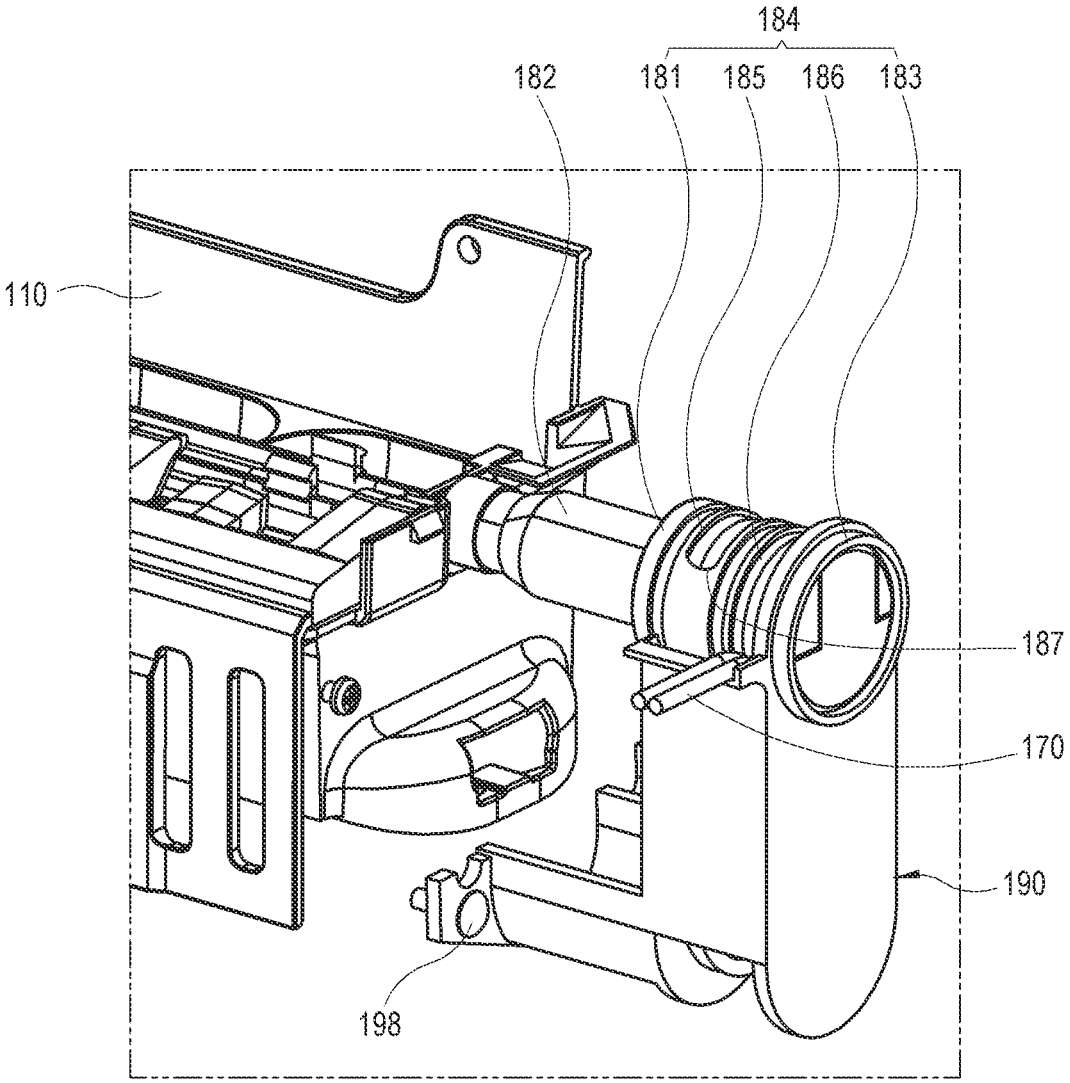
FIGS. 20 and 21 are views showing a mounting state and an exploded state of a cable guider and a cable holder for winding and unwinding an electric cable according to a fifth embodiment of the disclosure.

FIG. 20 is a view showing a mounting state of a cable guider 190 and a cable holder 180 for winding and unwinding an electric cable 170 according to a fifth embodiment of the disclosure. As shown therein, the cable holder 180 includes a barrel 182 having a hollow through which the electric cable 170 passes, and a roll 184 integrally extended from the barrel 182. The roll 184 includes first and second flanges 181 and 183 radially extended and protruding from both ends thereof, and an electric cable bobbin 185 provided between the first and second flanges 181 and 183. The electric cable bobbin 185 includes a spiral groove 186 formed to make the electric cable 170 be wound in turn on the outer circumferential surface. The spiral groove 186 includes an electric cable withdrawal hole 187 at a left starting portion thereof to communicate with the hollow of the barrel 182. The electric cable 170 from the heater passes through the hollow of the barrel 182, is withdrawn through the electric cable withdrawal hole 187, and is wound on the spiral groove 186 on the outer circumferential surface of the roll 184. In result, the electric cable 170 is wound and unwound on the spiral groove 186 as the roll 184 rotates.

Figure 21:
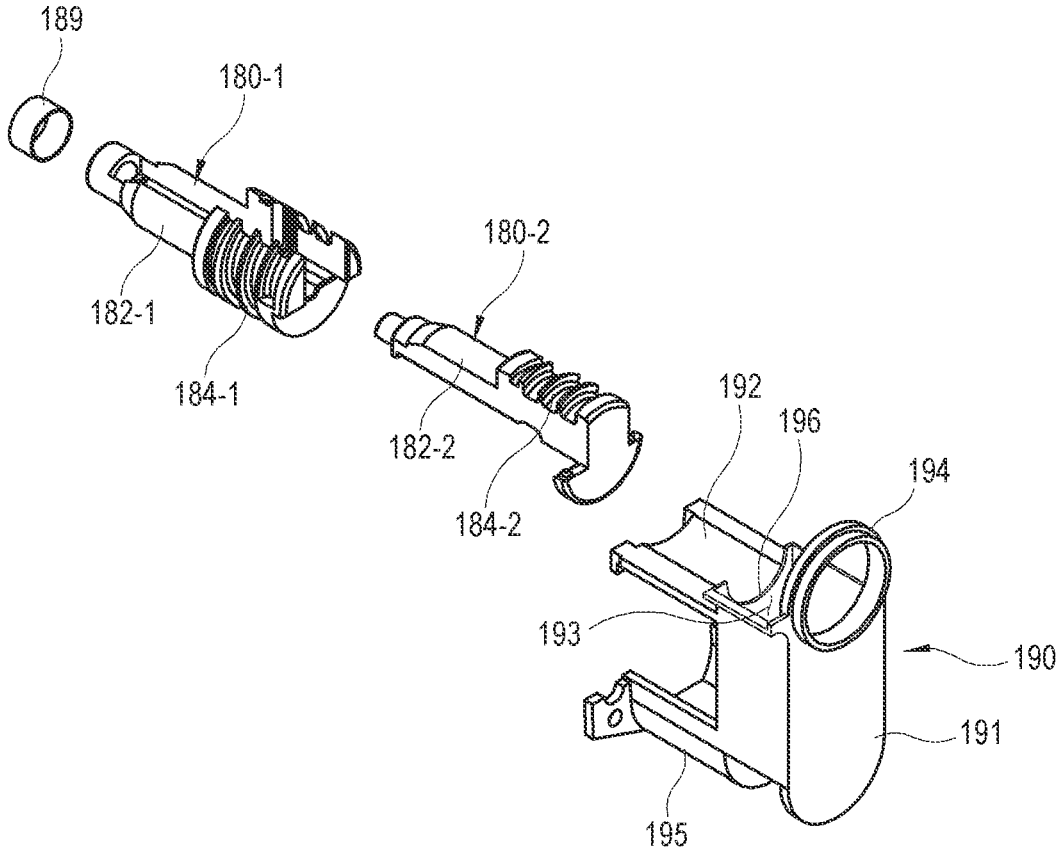

FIG. 21 is a view showing an exploded state of the cable guider 190 and the cable holder 180 for winding and unwinding the electric cable according to the fifth embodiment of the disclosure. As shown therein, a first holder 180-1 cut open in a longitudinal direction partially leaving a first barrel part 182-1 and a first roll part 184-1, and a second holder 180-2 cut from the first holder 180-1 and including a second barrel part 182-2 and a second roll part 184-2 are assembled into the cable holder 180 by a ring clip 189. The first holder 180-1 and the second holder 180-2 may be individually formed by injection molding and then fastened by the ring clip 189. Of course, the cable holder 180 may be formed as a single body.

The cable guider 190 includes a support main body 191 shaped like a hollow box; a holder supporter 192 extended from an upper portion of the support main body 191 in a front direction toward the ice making container 110, and supporting the cable holder 180; a roll accommodating portion 193 formed in an upper portion of the support main body 191; an electric-cable separation preventer 194 placed at a right side of the roll accommodating portion 193 and preventing separation of the electric cable 170 unwound as rotated; and a container holder 195 extended from a lower portion of the support main body 191 in a front direction toward the ice making container 110. The roll accommodating portion 193 includes a roll supporter 196 protruding at a different height from the left holder supporter 192. The container holder 195 is fastened to the ice making container 110 through a screw hole 198.

The barrel 182 of the cable holder 180 is extended up to the holder supporter 192 without contacting the holder supporter 192, and the roll 184 is arranged on the roll accommodating portion 193. In this case, the first flange 181 is positioned at a portion corresponding the height difference between the holder supporter 192 and the roll supporter 196. The roll 184 is arranged to be rotatable in the roll accommodating portion 193. The roll accommodating portion 193 is formed to communicate with the internal space of the support main body 191 so as to accommodate the electric cable 170 unwound from the roll 184. The electric-cable separation preventer 194 is adjacent to the second flange 183 and restricts separation of the electric cable 170, which is unwound as rotated, from the roll 184.

When ice is made, the electric cable 170 is tightly wound on the roll 184. When ice is separated, the electric cable 170 wound on the roll 184 in the forward direction is loosened and unwound. When ice is made again, the electric cable 170 is tightly wound by reverse rotation of the roll 184. In this manner, the electric cable 170 is smoothly wound or unwound as the roll 184 rotates in the forward and reverse directions. Here, descriptions about a gear or motor for rotating the roll 184 in the forward and reverse directions are omitted.

Figure 22:
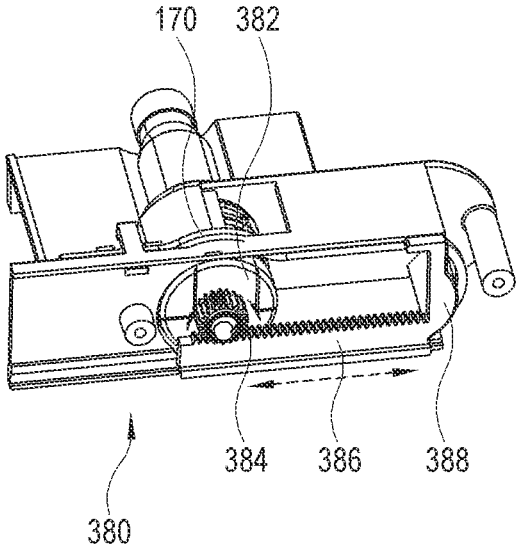
FIGS. 22 and 23 are perspective views of an electric-cable holder structure according to a sixth embodiment of the disclosure when ice is made and when the ice is released, respectively.
Figure 23:
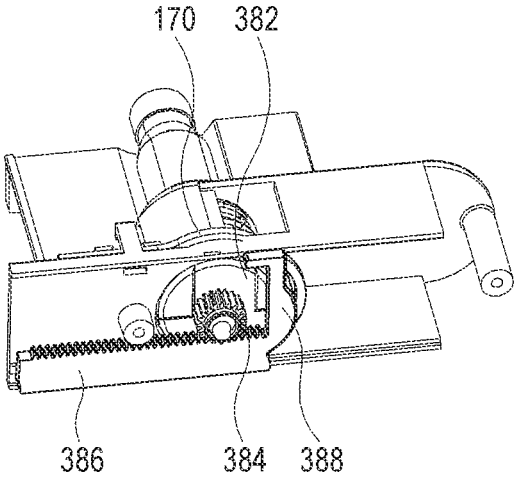

FIGS. 22 and 23 are perspective views of an electric-cable holder structure 380 according to a sixth embodiment of the disclosure when ice is made and when the ice is released, respectively.

The electric-cable holder structure 380 includes a cylindrical electric cable bobbin 382, a pinion 384 arranged at one side of the electric cable bobbin 382, a rack 386 engaging with the pinion 384, and an electric cable holder 388 integrally protruding upward from the rack 386 at a position spaced apart from the electric cable bobbin 382. The electric cable 170 connected to the heater is primarily wound on the electric cable bobbin 382 and secondarily held on the electric cable holder 388 at the spaced position, and returns to the electric cable bobbin 382. When the pinion 384 rotates forward to separate ice, the electric cable 170 is wound on the electric cable bobbin 382 and the rack 386 engaging with the pinion 384 moves to make the electric cable holder 388 get close to the electric cable bobbin 382. Then, when the pinion 384 rotates reversely to make ice, the electric cable 170 is unwound from the electric cable bobbin 382 and the rack 386 engaging with the pinion 384 moves reversely to make the electric cable holder 388 get away from the electric cable bobbin 382. Thus, the heater rotates forward and backward so that the electric cable 170 can be smoothly wound and unwound without being twisted.

Figure 24:
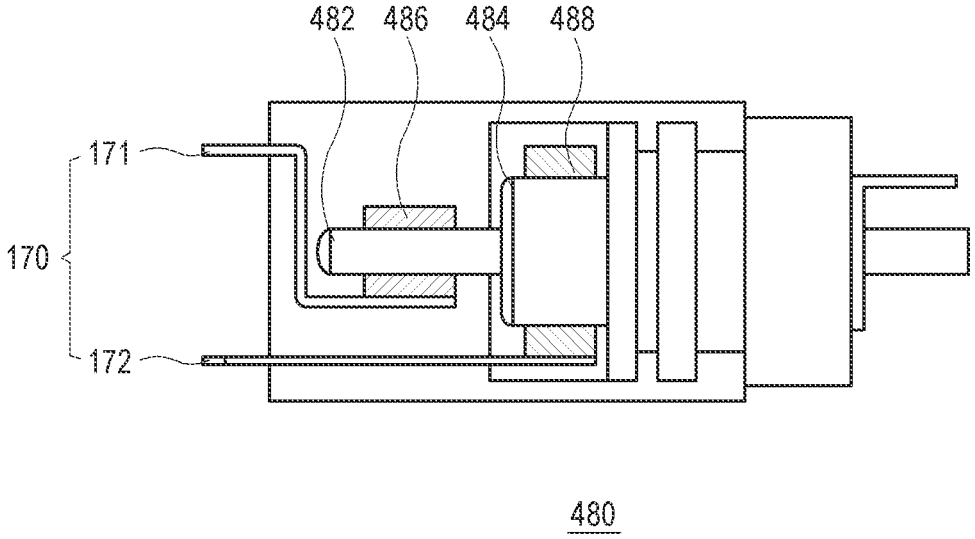
FIG. 24 is a view showing a power connector for supplying power while rotating based on rotation of a heater according to a seventh embodiment of the disclosure.

FIG. 24 is a view showing a power connector 480 for supplying power while rotating based on rotation of a heater according to a seventh embodiment of the disclosure. The power connector 480 includes a first power shaft 482 arranged at the center thereof, a second power shaft 484 surrounding the first power shaft 482 as insulated from the first power shaft 482, a first power ring 486 being in rotatable contact with the first power shaft 482, and a second power ring 488 being in rotatable contact with the second power shaft 484. First power (+) is applied to the first power shaft 482, and second power (−) is applied to the second power shaft 484. The first power ring 486 connects with the first electric cable 171 of the electric cable 170, and the second electric cable 172 is connected to the second power ring 488. When the heater rotates forward or backward, the first power ring 486 and the second power ring 488 respectively connecting with the first electric cable 171 and the second electric cable 172 are rotated while keeping contact with the first power shaft 482 and the second power shaft 484. Thus, the power connector 480 keeps supplying power even though the electric cable 170 rotates based on the rotation of the heater.

Figure 25:
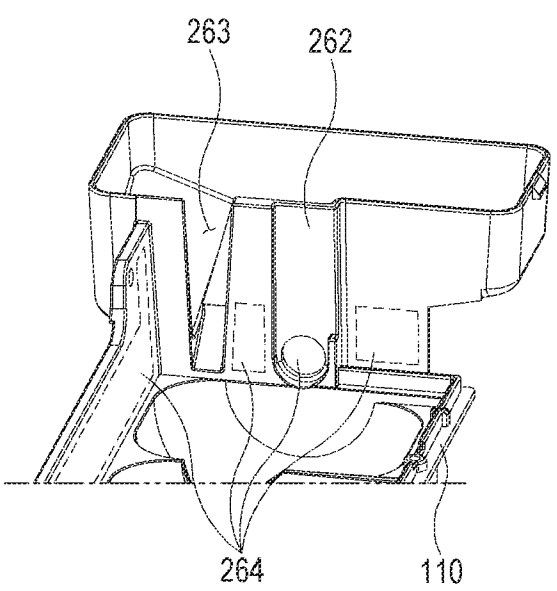
FIG. 25 is a perspective view showing an ice making container according to an eighth embodiment of the disclosure.
Figure 25:
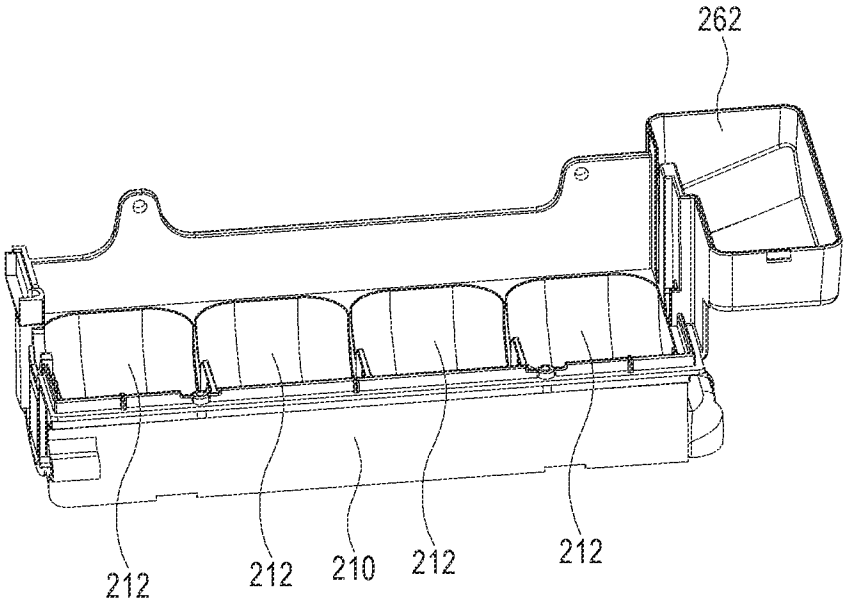

FIG. 25 is a perspective view showing an ice making container 210 according to an eighth embodiment of the disclosure. The ice making container 210 includes four ice-making cells 212 arranged in parallel, and a cup 262 adjacent to the rightmost ice-making cell 212. The cup 262 is positioned above the rightmost ice-making cell 212. The cup 262 includes an ice-making water outlet 263 communicating with the rightmost ice-making cell. The ice-making water discharged to the ice-making water outlet 263 fills the rightmost ice-making cell 212 and overflows into the other ice-making cells 212 in sequence. The ice making containers 210 may for example be integrally made of aluminum or the like material having thermal conductivity. In this case, the whole volume of the cup 262 is so large that relatively much chill can be transferred to the rightmost ice-making cell. Such transfer of the chill makes the rightmost ice-making cell be different in a temperature condition from the other three ice-making cells, and it is therefore difficult to make ice uniformly transparent. According to an embodiment of the disclosure, as shown in FIG. 25, at least one perforation 264 is provided in a connecting portion between the rightmost ice-making cell 212 and the cup 262. Thus, the perforation 264 in the connecting portion is used in reducing the chill transferred to the ice-making cell 212 adjacent to the cup 262.

Figure 26:
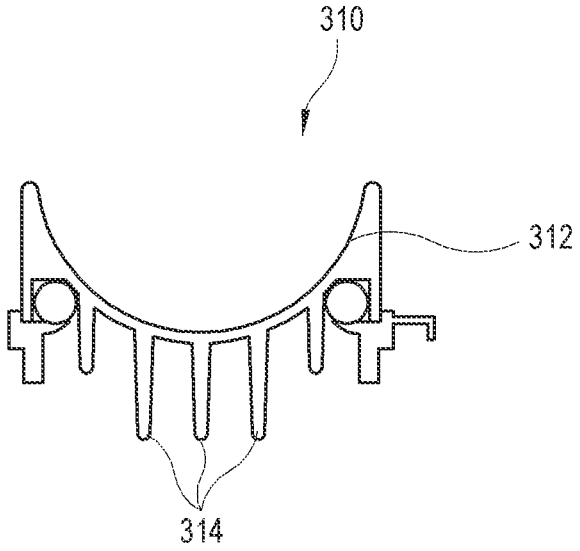
FIG. 26 is a perspective view showing a structure of an ice making container according to a ninth embodiment of the disclosure.

FIG. 26 is a perspective view showing a structure of an ice making container 310 according to a ninth embodiment of the disclosure. The ice making container 310 includes at least one cooling fin 314 on the outer bottom of the ice-making cell 312. The cooling fin 314 may be used in additionally increasing the amount of chill transferred to the ice-making cell 312. Usually, the ice making container 310 usually include four ice-making cells 312 arranged in parallel. All these four ice-making cells do not have the same temperature conditions because they are different in a chill transfer medium or thermal capacity according to positions. In this case, more cooling fins 314 are properly attached to the ice-making cell to which relatively less chill is applied, thereby making temperature control uniform throughout. Such uniform temperature control makes the ice uniformly transparent throughout.

Figure 27:
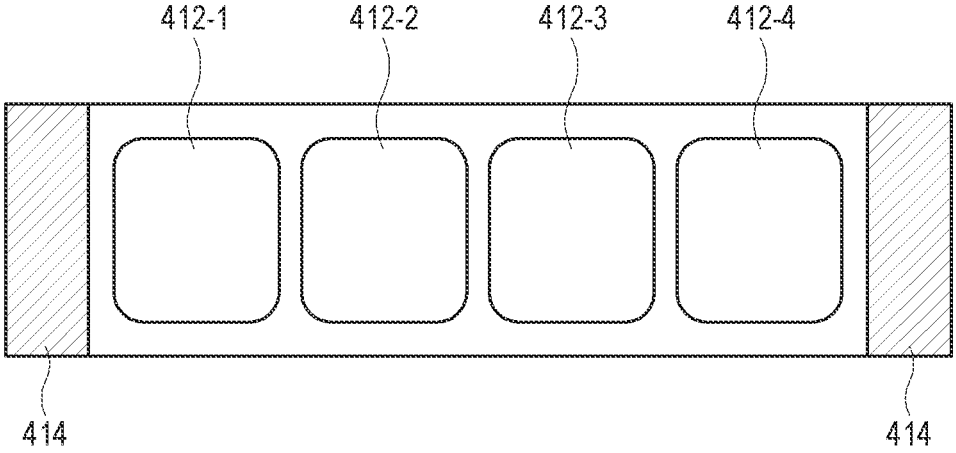
FIG. 27 is a view of showing a structure of an ice making container according to a ninth embodiment of the disclosure.

FIG. 27 is a view of showing a structure of an ice making container 410 according to a ninth embodiment of the disclosure. The ice making container 410 includes four ice-making cells 412-1~412-4 arranged in parallel, and insulation reinforcing members 414 mounted to edges of both outer ice-making cells 412-1 and 412-4. Both outer ice-making cells 412-1 and 412-4 transfer more chill than two inner ice-making cells 412-2 and 412-3. Therefore, the insulation reinforcing member 414 relatively reduces the area of receiving the chill, and makes a temperature condition uniform throughout all the ice-making cells 412-1~412-4. However, there are no limits to the mounted portion or shape of the insulation reinforcing members 414, and the insulation reinforcing members 414 may be alternatively mounted corresponding to conditions or positions where much chill is transferred.

Figure 28:
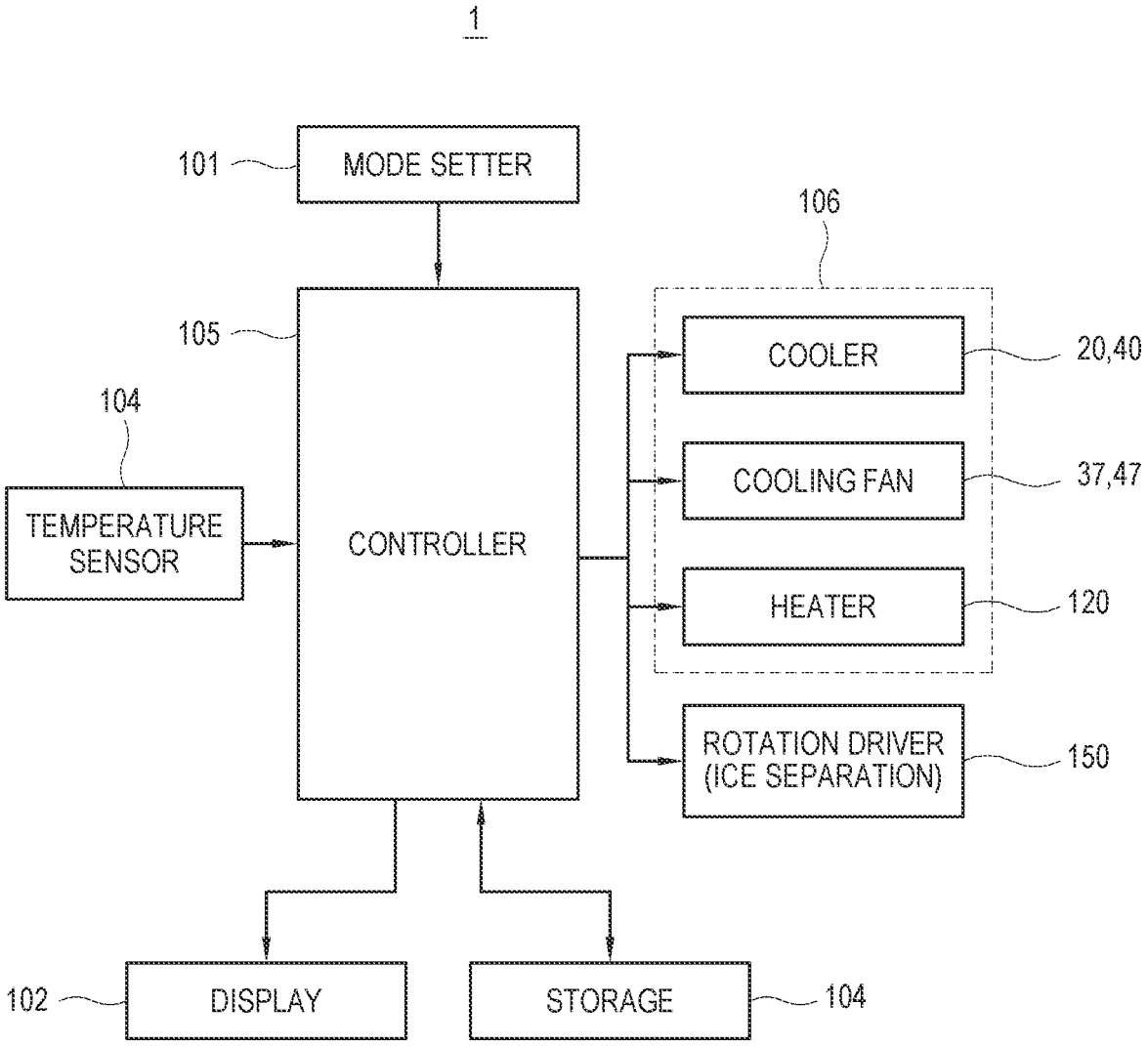
FIG. 28 is a block diagram showing control flow of an ice making system according to an embodiment of the disclosure.

FIG. 28 is a block diagram showing control flow of an ice maker 1 according to an embodiment of the disclosure. With reference to FIG. 28, the control flow of the ice maker 1 according to an embodiment of the disclosure will be described. As shown therein, the ice maker 1 includes a mode setter 101, a display 102, a temperature sensor 103, a storage 104, a controller 105, and a cooling system 106.

The ice maker 1 makes ice by cooling the ice-making water below a freezing point, and sets a target temperature. The target temperature is set as a default value when the ice maker 1 is manufactured, and may be changed by a user's control in the future. In general, the target temperature of the ice-making compartment 13 provided with the ice making unit 100 may for example be set to −20° C. as a default value.

The ice making unit 100 according to an embodiment of the disclosure may operate in a normal-ice making mode or a clear-ice making mode based on a user's selection using the mode setter 101. The normal-ice making mode refers to a mode where a large quantity of ice is quickly made regardless of transparency of ice, and the clear-ice making mode refers to a mode where ice is made slowly but has very high transparency. The normal-ice making mode or the clear-ice making mode is selectable by a user.

In accordance with the modes, the ice maker 1 determines an ice-making temperature of the ice-making compartment 13, and a temperature condition of the ice making container 110 through the cooling system 106.

The mode setter 101 may employ a button switch, a switch, a touch screen, etc. The mode setter 101 allows a user to select one of a quick ice-making mode, the normal-ice making mode or the clear-ice making mode, and additionally receives a command input about the amount of ice, a degree of transparency, etc. in each ice-making mode.

The display 102 may employ a liquid crystal display (LCD) panel, an organic light emitting diode (OLED) panel, or etc. The display 102 displays information about the ice-making mode, information about ice-making conditions of the ice-making compartment 13, and information about target temperatures and current temperature, power-saving operations or the like operations of the refrigerating compartment 11 and the freezing compartment 12.

The temperature sensor 103 is installed in the ice-making compartment 13 and/or the ice making container 110 and used for providing information about quick ice making or clear ice making, and information ice separation timing.

The storage 104 may employ a flash memory or the like, and is configured to store various pieces of information related to operations, such as a target temperature, an operation mode, etc. for the ice-making compartment 13, the freezing compartment 12, and the refrigerating compartment 11.

The controller 105 generally controls the elements of the ice maker 1 so that ice can be made in accordance with the normal-ice making mode or clear-ice making mode set by a user.

The controller 105 may for example be actualized by an integrated circuit having a control function like a system on chip (SoC), a central processing unit (CPU), a micro processing unit (MPU), or the like universal processor.

The universal processor executes a control program (or an instruction) for performing control operations, and the controller 106 may further include a nonvolatile memory in which the control program is installed.

The cooling system 106 may include the coolers 20 and 40, the ice-making fans 37 and 47, and the heater 120.

As described above with reference to FIGS. 2 and 4, the cooler 20, 40 includes the compressor 21, 41, the condenser 22, 42, the expansion valve 24, 44, the direct cooler 28a or the evaporator 45-1, 45-2, and the coolant pipe 28, 48. The coolant pipe 28, 48 connects the condenser 22, 42, the expansion valve 24, 44, and the direct cooler 28a or the evaporator 45-1, 45-2. The coolant flowing in the coolant pipe 28, 48 is discharged from the compressor 21, 41, passes through the condenser 22, 42 and the expansion valve 24, 44, is then supplied to the direct cooler 28a or the evaporator 45-1, 45-2, and exchanges heat with the air in the ice-making compartment 13, thereby cooling the air in the ice-making compartment 13.

The ice making fan 37, 47 is arranged inside the ice-making compartment 13 and circulates the chill, thereby controlling the temperature in the ice-making compartment 13. For precise control, the ice making fan 37, 47 may be mounted at various positions inside the ice-making compartment 13. Likewise, a plurality of ice making fans 37, 47 may be installed in one ice-making compartment 13.

The heater 120 is mounted to the ice making container 110 and adjusts the temperature of the heating rod 133, thereby controlling an ice making temperature and an ice making speed together with the cooler 20, 40, and the ice making fan 37, 47.

Figure 29:
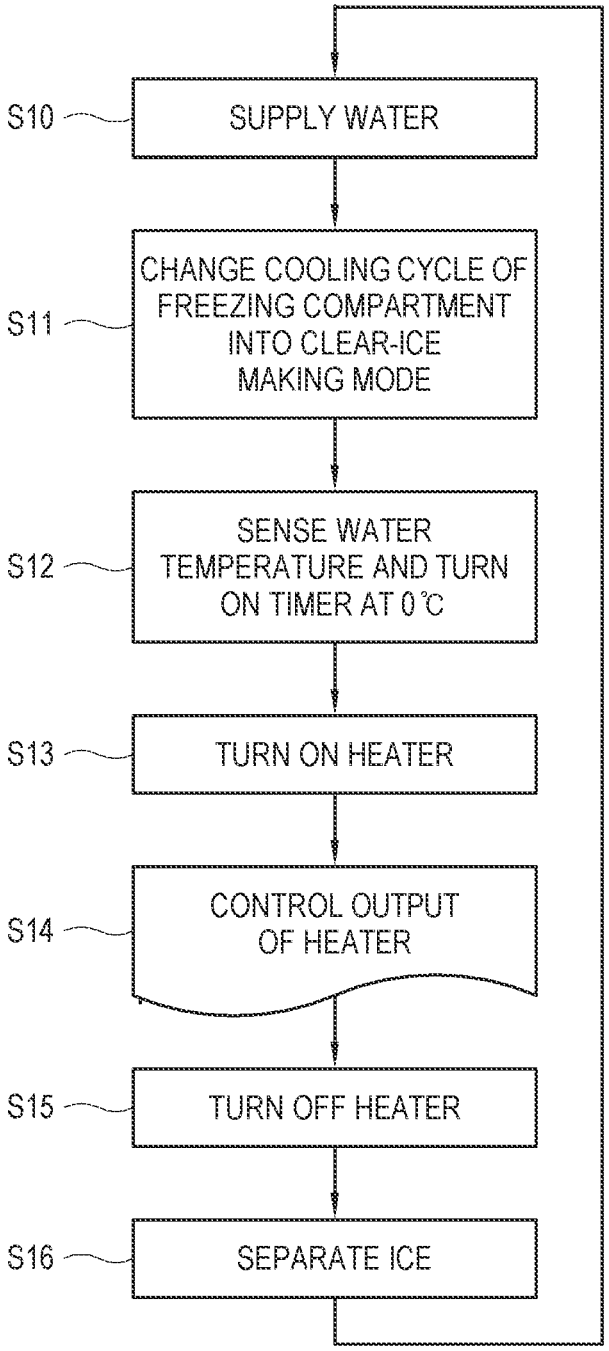
FIG. 29 is a flowchart showing a clear-ice making control process by controlling an output in an ice making system according to an eleventh embodiment of the disclosure.

FIG. 29 is a flowchart showing a clear-ice making control process by controlling an output in an ice maker 1 according to an eleventh embodiment of the disclosure.

At operation S10, the controller 105 supplies the ice-making water to the ice making container (or the ice-making tray) 110.

At operation S11, the controller 105 identifies the clear-ice making mode and changes a cooling cycle mode of the cooler 20, 40 and the ice making fan 37, 47 from the general mode into the clear-ice making mode. In this case, an automatic defrosting mode is turned off.

At operation S12, the controller 105 senses the temperature of the ice-making water through the temperature sensor 103, and sets a reference time at for example 0° C., thereby turning on a timer.

At operation S13, the controller 105 turns on the heater 120 to have a set output at a set time after the timer is on (i.e. the reference time).

At operation S14, the controller 105 controls the output of the heater 120 during a set time.

At operation S15, the controller 105 turns off the heater 120 when the ice is completely made as the set time elapses.

At operation S16, the controller 105 drives the rotation driver 150 to rotate the heating rod 133 or ejectors of the heating ice-separator 130, thereby separating the ice from the ice making container 110.

Figure 30:
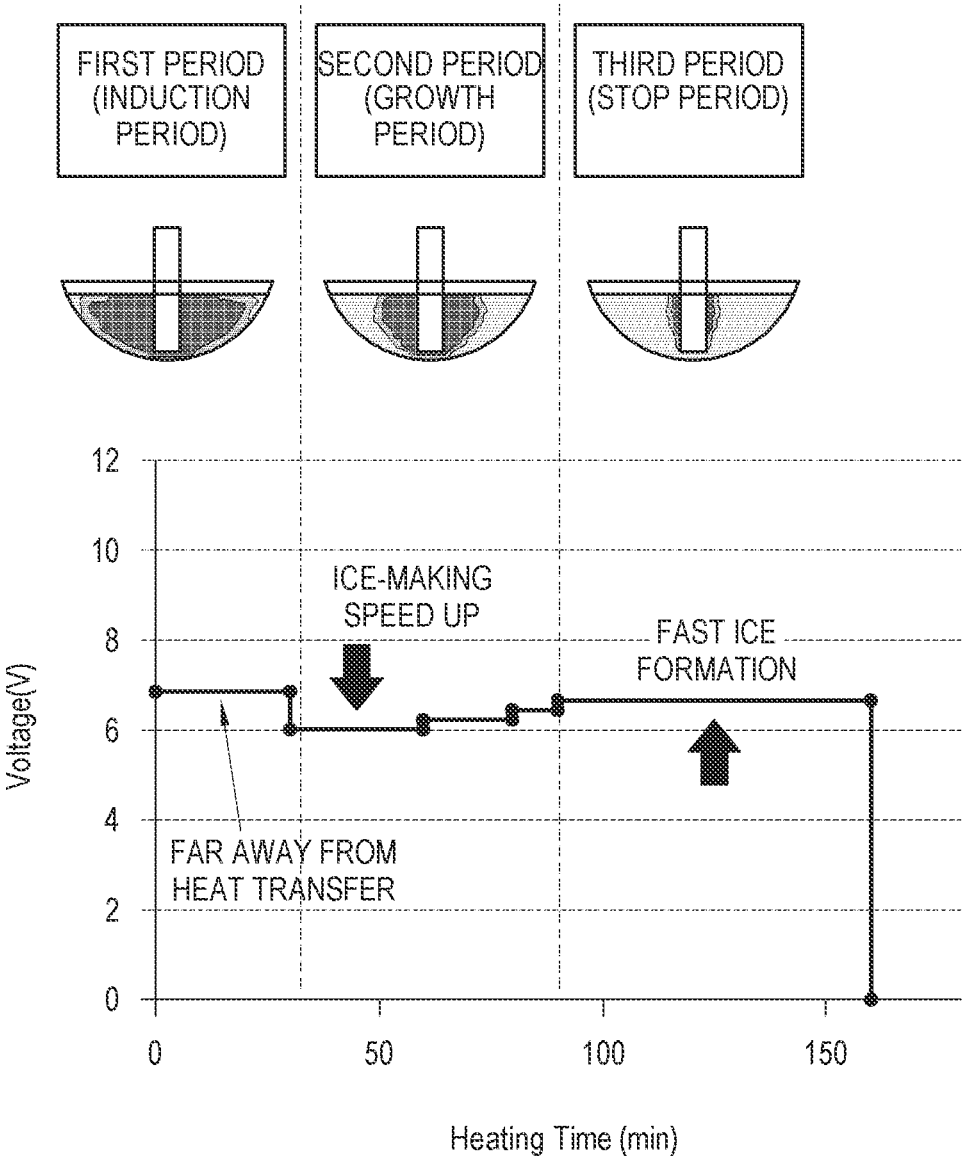
FIG. 30 is a view showing a method of controlling an output of a heater according to set time in a case of clear ice making.

FIG. 30 is a view showing a method of controlling an output of the heater 120 according to set time in a case of clear ice making.

A first period (i.e. induction period) refers to a section during which a phase transition from the ice-making water to the ice is induced. During the induction period, the controller 105 for example applies a single voltage of about 6.8V to the heater 120 for about 0~30 minutes and controls ice formation at a position far away from the heating rod 133.

The second period (i.e. growth period) refers to a section during which the growth of the ice is accelerated under a condition of a certain speed or below. During the growth period, the controller 105 for example applies a voltage of 5.9V for 30~60 minutes, a voltage of 6.2V for 60~80 minutes, and a voltage of 6.4V for 80~90 minutes to the heater 120, thereby growing the ice.

The third period (i.e. stop period) refers to a section during which an ice formation speed is the fastest. During the stop period, the controller 105 for example applies a voltage of 6.6V for 90~160 minutes to the heater 120.

Figure 31:
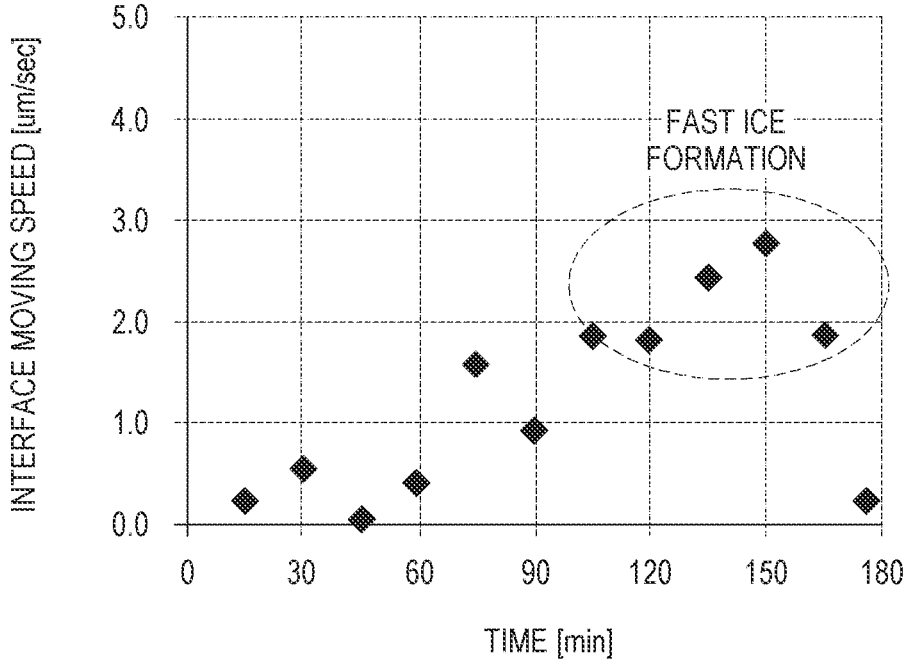
FIG. 31 is a graph showing a freezing speed according to ice-making periods.

FIG. 31 is a graph showing a freezing speed according to ice-making period. An abscissa indicates time, and an ordinate indicates an interface moving speed. As shown therein, the fastest section of the ice formation speed corresponds to 100~160 minutes during which the interface moving speed is higher than or equal to about 2.0 (μm/sec).

As show in FIG. 30, the controller 105 in the first period (i.e. induction period) applies heat based on relatively high voltage to the heating rod 133 and thus lowers a freezing speed in order to improve transparency of ice formed at the farthest position from the heating rod 133. In the second period (i.e. growth period), the controller 105 slightly lowers the temperature of the heating rod 133 and thus accelerates the ice formation. In the third period (i.e. stop period), the controller 105 slightly raises the temperature of the heating rod 133 in order to prevent ice formation from proceeding excessively fast with surrounding ice. Thus, the controller 105 changes the temperature of the heating rod 133 at every operation where the ice is made in the ice making container, thereby making the ice with higher transparency. In the foregoing examples, the voltage and the set time for controlling the temperature of the heating rod 133 are merely an example, and may be variously adjusted according to surrounding conditions.

Figure 32:
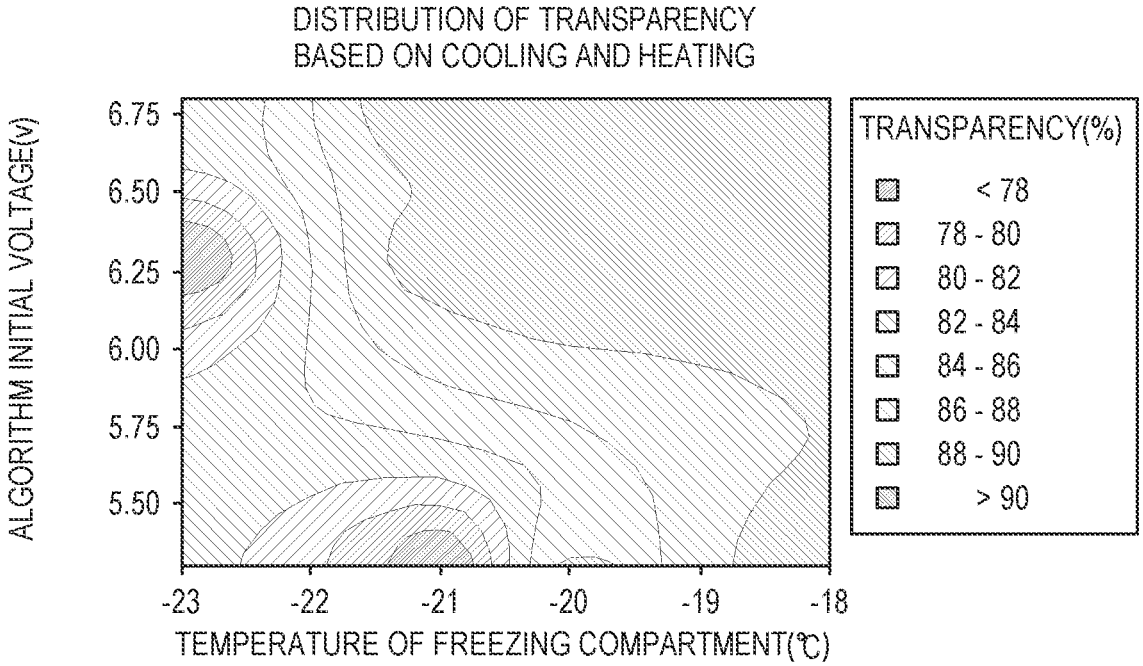
FIG. 32 is a view showing transparency distribution according to ice-making conditions.

FIG. 32 is a view showing transparency distribution according to ice-making conditions. In the shown distribution, an abscissa indicates a temperature of an ice-making compartment, and an ordinate indicates an initial voltage. As shown therein, ice is made to have a transparency of 90% or higher under conditions that the temperature of the ice-making compartment is higher than or equal to about −21° C., and the initial voltage is higher than or equal to about 6.00V.

Figure 33:
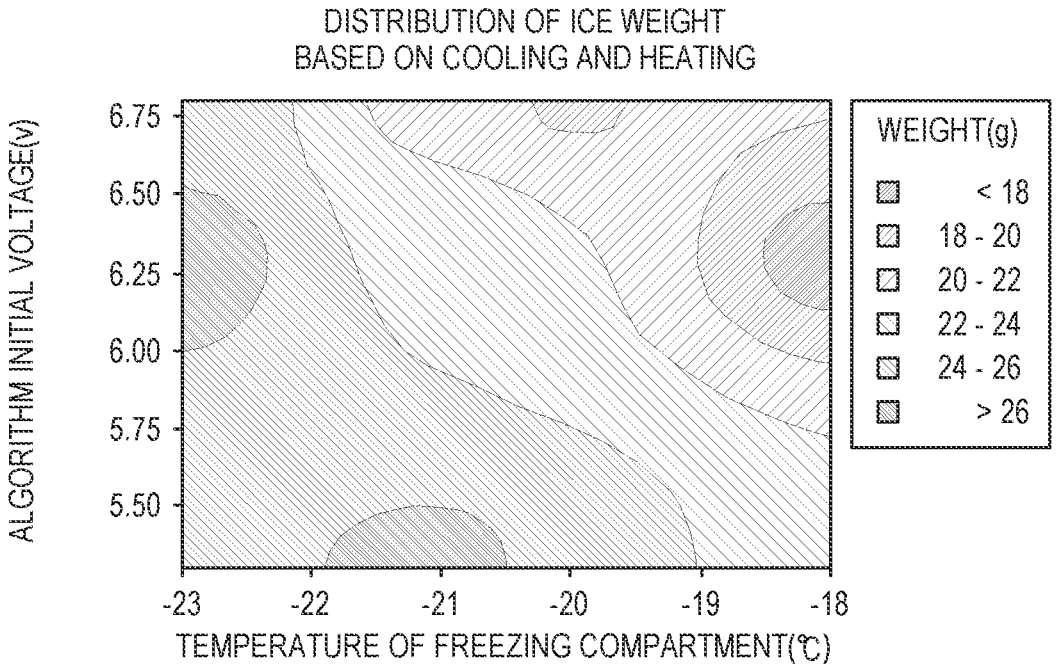
FIG. 33 is a view showing ice weight distribution according to ice-making conditions.

FIG. 33 is a view showing ice weight distribution according to ice-making conditions. In the shown distribution, an abscissa indicates a temperature of an ice-making compartment, and an ordinate indicates an initial voltage. Ice is made to have a weight of 24~26 g under conditions that the temperature of the ice-making compartment is lower than or equal to about −21° C., and the initial voltage is lower than or equal to about 6.00V.

As shown in FIGS. 32 and 33, the transparency and weight of the ice are determined based on conditions incompatible with each other. Under these conditions, the ice maker 1 may operate by selectively entering the clear-ice making mode or the quick ice-making mode.

Figure 34:
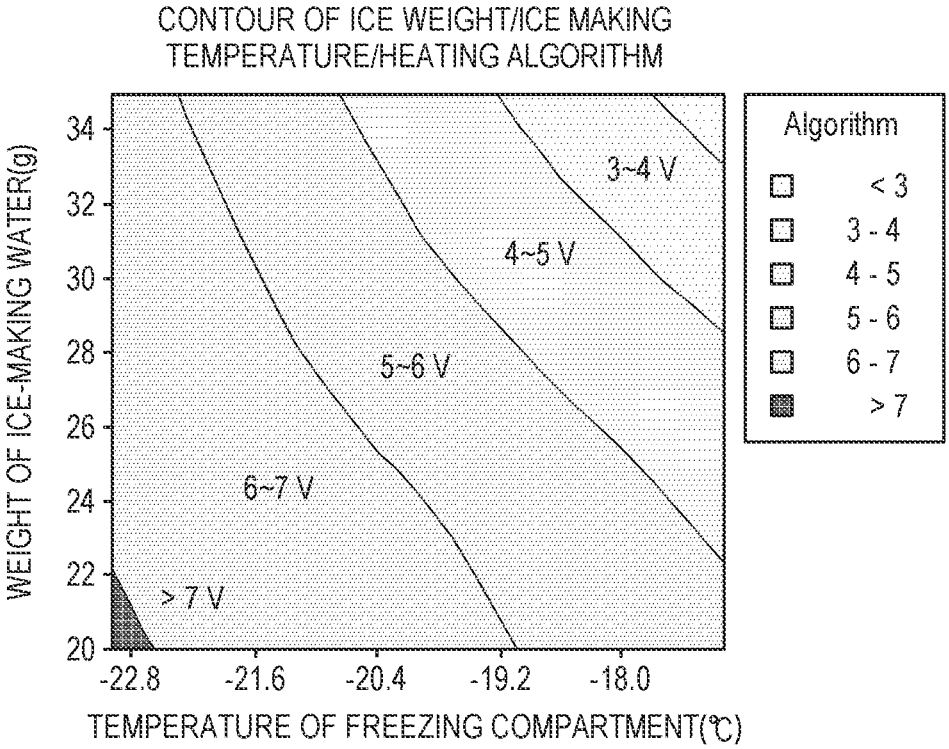
FIG. 34 is a view showing optimal control according to change in ice-making conditions.

FIG. 34 is a view showing optimal control according to change in ice-making conditions. An abscissa indicates a temperature of an ice-making compartment, and an ordinate indicates weight of ice. As shown therein, a contour of an initial voltage applied to a heater shows that the weight of the ice increases as the initial voltage gradually becomes lower and decreases as the initial voltage gradually becomes higher. On the other hand, the transparency of the ice is lowered as the initial voltage gradually becomes lower and raised as the initial voltage gradually becomes higher.

Figure 35:
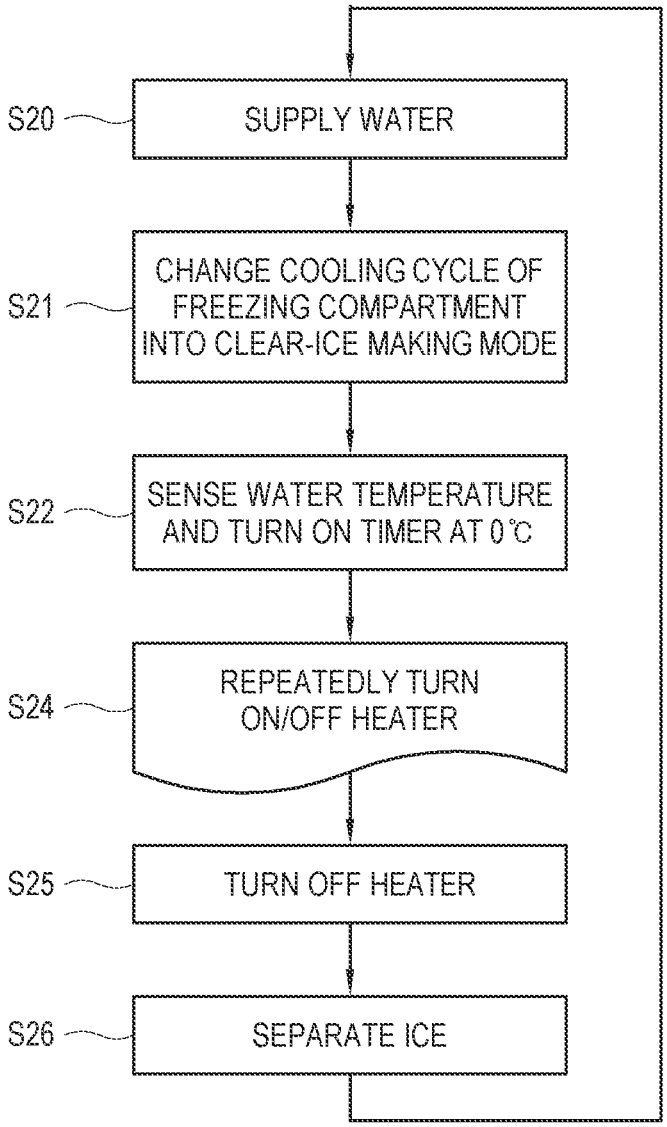
FIG. 35 is a flowchart showing a clear-ice making control process by on/off control in an ice making system according to a twelfth embodiment of the disclosure.

FIG. 35 is a flowchart showing a clear-ice making control process by on/off control in an ice maker 1 according to a twelfth embodiment of the disclosure.

At operation S20, the controller 105 supplies the ice-making water to the ice making container (or the ice-making tray) 110.

At operation S21, the controller 105 identifies the clear-ice making mode and changes a cooling cycle mode of the cooler 20, 40 from the general mode into the clear-ice making mode. In this case, an automatic defrosting mode is turned off.

At operation S22, the controller 105 senses the temperature of the ice-making water through the temperature sensor 103, and sets a reference time at for example 0° C., thereby turning on a timer.

At operation S23, the controller 105 turns on or off the heater 120 on a set cycle at a set time after the timer is on (i.e. the reference time). In this case, a voltage applied to the heater 120 is constant.

At operation S24, the controller 105 turns off the heater 120 when the ice is completely made as the set time elapses.

At operation S25, the controller 105 drives the rotation driver 150 to rotate the heating rod 133 of the heating ice-separator 130, thereby separating the ice from the ice making container 110.

Figure 36:
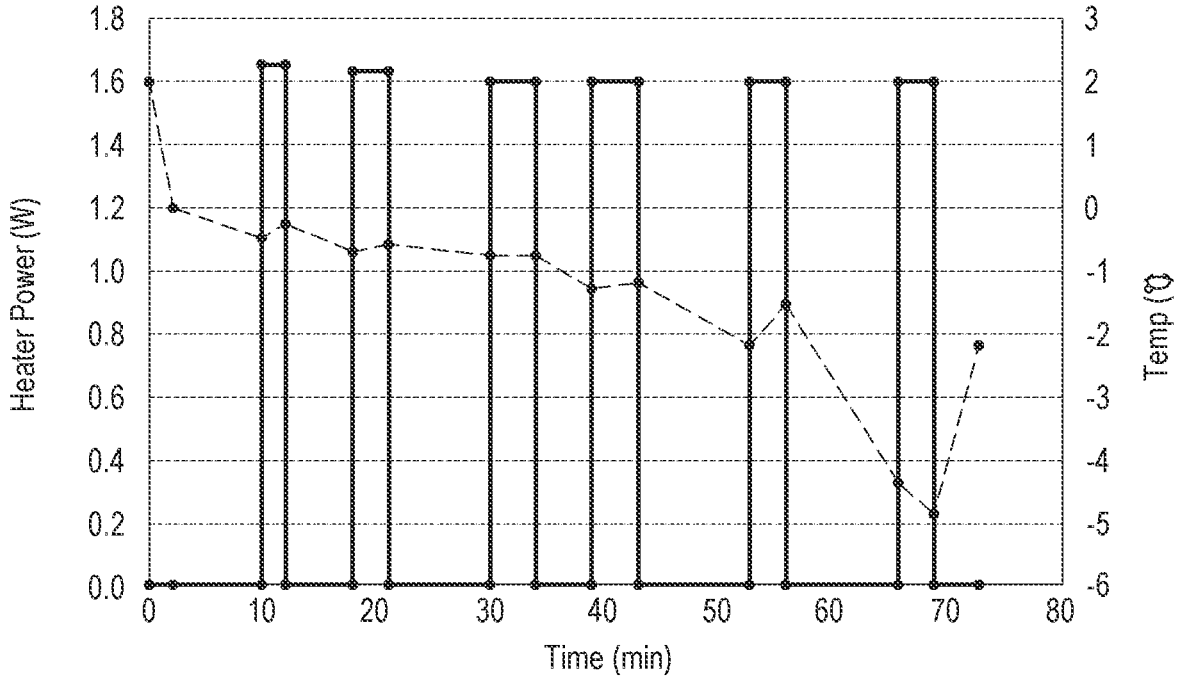
FIG. 36 is a view showing a method of controlling a heater to be turned on and off according to set time when clear ice is made.

FIG. 36 is a graph showing a method of controlling a heater to be turned on and off according to set time when clear ice is made. In the graph, an abscissa indicates time (minutes, min), a left ordinate indicates heating power (W), and a right ordinate indicates a temperature (° C.) of the ice-making water. As shown therein, the controller 105 repeatedly performs a process, in which the heater 120 is turned on at the set time, maintained for a certain period of time and turned off, until the ice formation is completed. In detail, the heater 120 is turned by power of 1.6 W on every about 10 minutes, maintained for a predetermined period of time (e.g. an irregular period of time), and turned off. As shown in a dotted line on the graph of FIG. 36, the temperature of the ice-making water is gently lowered while the heater 120 is controlled to be turned on and off, thereby lowering a freezing speed.

Figure 37:
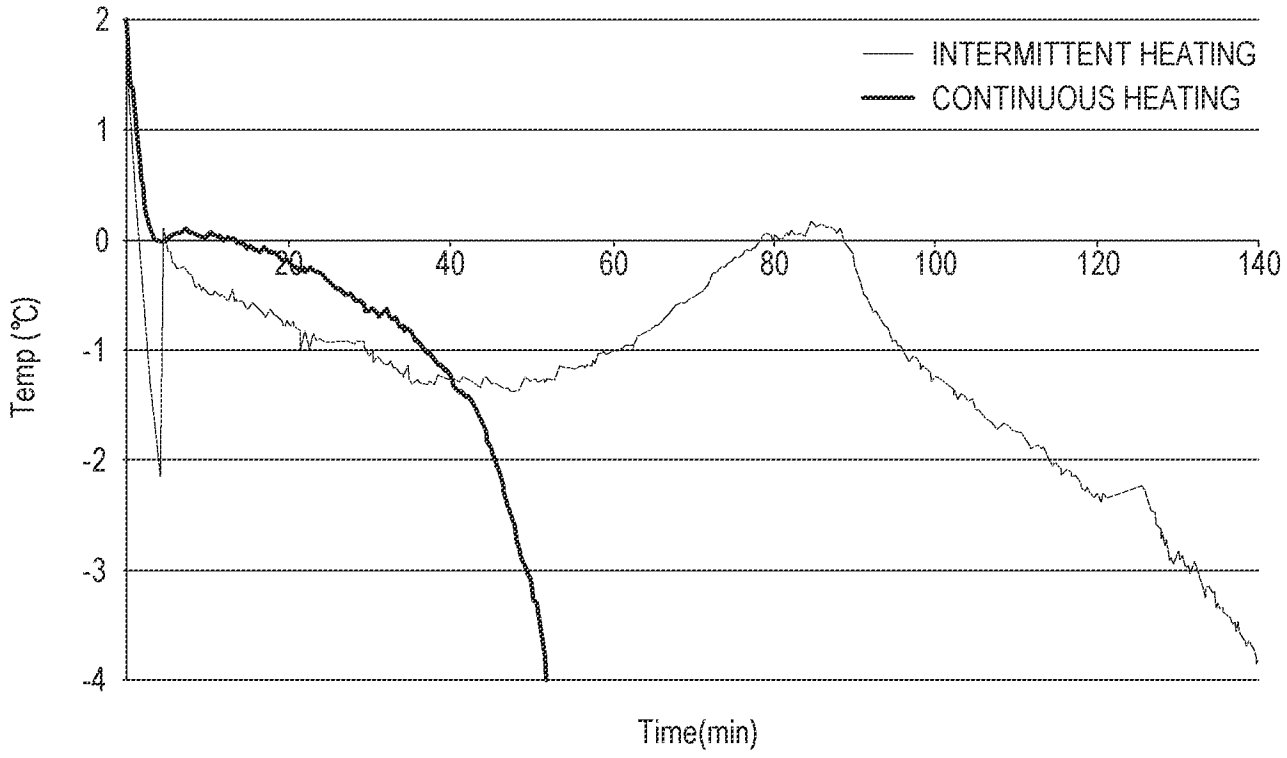
FIG. 37 is a graph showing a clear-ice making temperature pattern according to on/off control of a heater.

FIG. 37 is a graph showing a clear-ice making temperature pattern according to the on/off control of the heater 120. In the graph, an abscissa indicates time (minutes, min), and an ordinate indicates temperature (° C.) of the ice-making water. As shown therein, the temperature for the normal-ice making is rapidly dropped below −4° C. in 40 minutes, and thus ice is generated involving a white residue. On the other hand, the clear-ice making delays ice formation as the heater 120 is controlled to be turned on and off. That is, the temperature of the ice-making water at the clear-ice making is slowly decreased below −4° C. over about 140 minutes, and thus ice is generated with high transparency.

FIG. 38 is a table showing clear-ice making results according to keeping (heating) time and power on/off periods of the heater 120. As shown in the table, ice is made to have a transparency of 90% or higher when the heater 120 is turned on and off every 2~5 minutes and kept for 2~2.5 minutes. Of course, the foregoing period and the keeping time are merely an example, and may be varied depending on cooling conditions.

According to an embodiment of the disclosure, the ice maker is effective as follows.

First, a single freezing direction is formed from the inner surface of the ice making container toward the center, i.e. the heating ice-separator, thereby making ice with improved transparency.

Second, the heating rod is rotated as immersed in the ice making container after the ice is completely made, thereby simplifying a structure for making and separating ice.

Third, a plurality of ice-making cells is controlled to have uniform freezing conditions on the ice-making tray, thereby further improving the transparency of the ice.

Fourth, the rotary shaft rotates leaving a gap between the rotary shaft and the heater inserted therein, thereby improving the durability of the heater.

Fifth, the rotary shaft includes the first rotary shaft made of metal having high thermal conductivity and the second rotary shaft made of plastic by injection molding, and the first rotary shaft and the second rotary shaft are coupled leaving an air gap, so that heat used in heating the ice-making water can be focused on the heating rod.

Sixth, the heater is varied in power or powered on and off for a predetermined period of time, thereby making ice with higher transparency.

Seventh, the durability of the electric cable for applying power while the heater is rotating is effectively improved in durability.

Although a few embodiments have been described in detail, the present inventive concept is not limited to these embodiments and various changes may be made without departing from the scope defined in the appended claims.

What is claimed is:

1. An ice maker comprising:

an ice making container including an ice-making cell;

a heating ice-separator comprising a rotary shaft, and a heating rod coupled to the rotary shaft, and configured to, with ice-making water filled into the ice-making cell, extend from above a water surface of the ice-making water so that at least a distal end of the heating rod extends into a center of the ice-making cell and to a bottom of the ice-making cell and thereby ice formation proceeds in the ice-making cell from lateral sides of an inner surface of the ice-making cell toward the heating rod located at the center of the ice-making cell, and, with at least the distal end extending into the ice-making water, to transfer heat to the ice-making water, wherein the rotary shaft is configured to, with the distal end extending into the ice-making cell and at least some of the ice-making water having been formed into ice, rotate the heating rod so that the distal end no longer extends into the ice-making cell, to separate the ice from the ice-making cell or to separate the heating rod from the ice; and a heater configured to supply heat to the heating rod.

2. The ice maker according to claim 1, wherein the ice-making cell has a hemispheric inner surface.

3. The ice maker according to claim 2, wherein the distal end of the heating rod extends to the bottom of the ice-making cell within a range not affecting rotation of the heating rod.

4. The ice maker according to claim 1, wherein the rotary shaft comprises a hollow in a lengthwise direction, and the heater is inserted in the hollow of the rotary shaft.

5. The ice maker according to claim 4, wherein the rotary shaft rotates around the heater.

6. The ice maker according to claim 4, wherein the heater is provided so as to leave an air gap from an inner surface of the rotary shaft.

7. The ice maker according to claim 4, further comprising:

a motor configured to rotate the rotary shaft, wherein the rotary shaft comprises:

a first rotary shaft supporting the heater and comprising the heating rod; and a second rotary shaft coupling with the first rotary shaft, and transferring power of the motor to the first rotary shaft.

8. The ice maker according to claim 7, wherein the first rotary shaft comprises a material having high thermal conductivity, and the second rotary shaft comprises a material having lower thermal conductivity than the first rotary shaft.

9. The ice maker according to claim 7, wherein the second rotary shaft is provided so as to leave an air gap from the first rotary shaft.

10. The ice maker according to claim 1, wherein the heating rod comprises a heating head comprising an outer circumferential surface having a curvature corresponding to the inner surface of the ice-making cell.

11. The ice maker according to claim 1, wherein the heating rod comprises a plurality of pores.

12. The ice maker according to claim 1, wherein the heating rod has been subjected to hydrophilic surface treatment.

13. The ice maker according to claim 1, wherein the heating rod is internally provided with a hollow, and the heater is inserted in the hollow.

14. The ice maker according to claim 1, wherein the heater comprises an electric cable configured to supply power, the heater is configured to rotate as the heating rod rotates, and the electric cable is arranged to be wound and unwound as the heater rotates.

15. The ice maker according to claim 4, wherein the heater is configured to rotate when ice is made or separated, and a power connector is provided to supply power corresponding to the rotation of the heater.

16. The ice maker according to claim 1, further comprising an ice-separation guide extended from an edge of the ice making container toward the rotary shaft, and configured to guide ice to be separated from the heating rod.

17. The ice maker according to claim 16, wherein the ice-separation guide has an arc shape of which a radius of curvature gradually decreases from the edge of the ice making container toward the rotary shaft.

18. The ice maker according to claim 1, further comprising a container supporter arranged above the ice making container, configured to support the ice making container, and comprising a cup to supply the ice-making water to the ice making container.

19. The ice maker according to claim 1, wherein the ice making container comprises a cup adjacent to and integrated with the ice-making cell and configured to supply the ice-making water, and at least one perforation is provided in a connecting portion between the ice-making cell and the cup.

20. The ice maker according to claim 1, wherein the ice making container comprises a cooling fin to promote cooling of the ice-making water.

21. An ice maker comprising:

an ice making container including an ice-making cell;

a heating ice-separator comprising a rotary shaft, and a heating rod coupled to the rotary shaft, and configured to, with ice-making water filled into the ice-making cell, extend from above a water surface of the ice-making water so that at least a distal end of the heating rod extends into the ice-making cell and thereby extends into the ice-making water, and, with at least the distal end extending into the ice-making water, to transfer heat to the ice-making water, wherein the rotary shaft is configured to, with the distal end extending into the ice-making cell and at least some of the ice-making water having been formed into ice, rotate the heating rod so that the distal end no longer extends into the ice-making cell, to separate the heating rod from the ice;

a heater configured to supply heat to the heating rod; and an ejector which rotates at a same time as the heating rod, to eject, from the ice-making cell, the ice from which the heating rod is separated.

22. An ice maker comprising:

an ice making container;

a cooler configured to supply a chill;

a heater configured to generate heat;

a heating rod configured to, with ice-making water filled into a space of the ice making container, extend from above a water surface of the ice-making water so that at least a distal end of the heating rod extends into a center of the ice making container and to a bottom of the ice making container and thereby ice formation proceeds in the ice making container from lateral sides of an inner surface of the ice making container toward the heating rod located at the center of the ice making container, while at least the distal end extending into the ice-making water, transfer the heat generated by the heater to the ice-making water, and, with at least some of the ice-making water having been formed into ice by the supply of chill by the cooler, rotate to separate the ice from the space or to separate the heating rod from the ice; and a motor configured to rotate the heating rod.

23. An ice maker comprising:

a main body comprising an ice-making compartment;

a cooler configured to supply chill to the ice-making compartment;

an ice making container in the ice-making compartment and comprising at least one ice-making cell;

a heater configured to generate heat;

a heating rod configured to, with ice-making water filled in the ice-making cell, extend from above a water surface of the ice-making water so that at least a distal end of the heating rod extends into a center of the ice-making cell and to a bottom of the ice-making cell and thereby ice formation proceeds in the ice-making cell from lateral sides of an inner surface of the ice-making cell toward the heating rod located at the center of the ice-making cell, with at least the distal end of the heating rod extending into the ice-making water, transfer heat generated by the heater to the ice-making water, and with at least the distal end of the heating rod extending into the ice-making water and at least some of the ice-making water forming ice by the supply of chill by the cooler, rotate to separate the ice from the ice-making cell or to separate the heating rod from the ice; and a controller configured to control power supplied to the heater.

24. The ice maker according to claim 23, further comprising an ice making fan configured to circulate the chill.

25. The ice maker according to claim 23, wherein the controller changes an output of the heater for a predetermined period of time.

26. The ice maker according to claim 23, wherein the controller controls the heater to be turned on or off a plurality of times for a predetermined period of time.

*27. A refrigerator comprising:*

*a main body;*

*a cooler configured to supply cold air; and*

*an ice-making unit provided inside the main body,*

*wherein the ice-making unit includes:*

*an ice-making container including a plurality of ice-making cells arranged in a single row and configured to accommodate ice-making water;*

*a plurality of ejector rods configured to be aligned with respective ice-making cells and to separate ice from the respective ice-making cells by pushing the ice in the respective ice-making cells;*

*a reinforcing heat insulator provided at an outside of a first ice-making cell of the plurality of ice-making cells to reduce the cold air transmitted to the first ice-making cell;*

*a container support arranged to cover at least a portion of an upper side of the ice-making container; and*

*a heater extending at least partially above and adjacent to each of the plurality of ice-making cells and configured to supply heat to the plurality of ice-making cells,*

*wherein the reinforcing heat insulator is provided immediately adjacent the first ice-making cell which is an end cell of the plurality of ice-making cells, but is not provided immediately adjacent a second cell of the plurality of ice-making cells.*

*28. The refrigerator of claim 27, wherein the ice-making unit further includes*

*a temperature sensor provided to detect a temperature of the ice-making water supplied to the plurality of ice-making cells.*

*29. The refrigerator of claim 28, further comprising a controller provided to control the heater, the temperature sensor, and a timer,*

*wherein the controller is configured to turn on the timer based on the temperature of the ice-making water detected by the temperature sensor reaching a reference temperature.*

*30. The refrigerator of claim 29, wherein the controller is configured to turn on the heater with a preset output at a preset time after the timer is turned on.*

*31. The refrigerator of claim 27, wherein the ice-making unit further includes:*

*a rotation driver configured to supply power; and*

*the plurality of ejector rods configured to receive the power from the rotation driver and separate pieces of ice of the plurality of ice-making cells from the plurality of ice-making cells.*

*32. The refrigerator of claim 27, wherein the container support is mounted with a cup that supplies the ice-making water to one of the plurality of ice-making cells,*

*wherein the cup supplies the ice-making water to an ice-making cell adjacent to a lower end of the cup among the plurality of ice-making cells.*

*33. The refrigerator of claim 32, wherein the ice-making container is provided such that the ice-making water supplied from the cup passes through the ice-making cell adjacent to the lower end of the cup and flows to another ice-making cell adjacent to the ice-making cell adjacent to the lower end of the cup.*

*34. The refrigerator of claim 27, wherein each of the plurality of ice-making cells of the ice-making container includes a hemispherical inner circumferential surface.*

*35. The refrigerator of claim 27, wherein the heater is inserted into a predetermined groove that extends along a direction in which the plurality of ice-making cells are arranged.*

*36. The refrigerator of claim 27, further comprising:*

*a fan provided to cause the cold air supplied from the cooler to flow;*

*a cold air supply duct arranged at a rear side of the main body; and*

*a cold air exhaust port configured to exhaust the cold air from the cold air supply duct into the main body,*

*wherein the ice-making unit is arranged at a front side of the cold air exhaust port.*

*37. The refrigerator of claim 36, wherein the reinforcing heat insulator is mounted on the outside of the ice-making cell adjacent to the cold air exhaust port.*

*38. The refrigerator of claim 27, wherein the ice-making unit further includes an ice-separating guide that extends downward with respect to one side of the ice-making container, the ice-separating guide including a cold air hole provided to allow the cold air to pass therethrough.*

*39. The refrigerator of claim 38, wherein the cold air hole has a size smaller than a size of the ice to prevent the ice from passing through the cold air hole.*

*40. The refrigerator of claim 38, wherein the container support and the ice separating guide are formed of a plastic material.*

*41. The refrigerator of claim 27, wherein the heater rotates with respect to a predetermined axis when pieces of ice of the plurality of ice-making cells are separated from the plurality of ice-making cells.*

*42. The refrigerator of claim 41, further comprising a controller provided to control the heater,*

*wherein the controller is configured to turn off the heater before the separating of the pieces of ice of the plurality of ice-making cells from the plurality of ice-making cells.*

*43. The refrigerator of claim 27, further comprising a rotation driver configured to supply power,*

*the heater rotates with respect to a predetermined axis by receiving the power from the rotation driver when pieces of ice of the plurality of ice-making cells are separated from the plurality of ice-making cells.*

*44. The refrigerator of claim 43, wherein the ice-making unit further includes an injector configured to separate the pieces of ice of the plurality of ice-making cells from the plurality of ice-making cells by receiving the power from the rotation driver when the heater is rotated.*

*45. The refrigerator of claim 27, wherein the second cell is not an end cell of the plurality of ice-making cells.*

*46. The refrigerator of claim 45, wherein the first and second cells are arranged linearly in the plurality of cells.*

*47. The refrigerator of claim 27, wherein a third cell of the plurality of ice-making cells is located between the first cell and the second cell of the plurality of ice-making cells.*

*48. The refrigerator of claim 47, wherein the first, second and third cells are arranged linearly.*

*49. The refrigerator of claim 47, wherein the first, second and third cells are arranged linearly and are configured to be overlapped by an elongated support that supports the plurality of ejector rods.*

*50. The refrigerator of claim 49, wherein the ejector rods are heater rods.*

*51. The refrigerator of claim 27, wherein the second cell is adjacent the first cell in the plurality of ice-making cells, so that no other cell of the plurality of ice-making cells is located between the first cell and the second cell.*

*52. The refrigerator of claim 27, wherein the reinforcing heat insulator does not entirely surround the first cell as viewed from above.*

*53. The refrigerator of claim 27, wherein the reinforcing heat insulator is provided at only one side of the first cell.*

*54. The refrigerator of claim 27, wherein the first cell is closer to a cold air supply than is the second cell.*

*55. The refrigerator of claim 27, wherein the reinforcing heat insulator is provided immediately adjacent the first ice-making cell which is an end cell of the plurality of ice-making cells, but is not provided immediately adjacent a second cell of the plurality of ice-making cells, so that ice forming is more uniform across the plurality of ice-making cells.*

*56. The refrigerator of claim 27, wherein the heater includes a first wire and a second wire disposed parallel to the first wire.*

* * * * *